United States Patent
Gururajan et al.

(10) Patent No.: US 12,225,847 B2
(45) Date of Patent: Feb. 18, 2025

(54) CROP MONITORING SYSTEM AND METHOD

(71) Applicant: B-Hive Innovations Limited, Branston (GB)

(72) Inventors: Vidyanath Gururajan, Lincoln (GB); Alison Wright, Lincoln (GB); Mark Hansen, Bristol (GB); Ian Hales, Bristol (GB); Melvyn Smith, Bristol (GB); Lyndon Smith, Bristol (GB); Dave Samworth, Bristol (GB); Luke Greenwood, Grantham (GB)

(73) Assignee: HARVESTEYE LIMITED, Lincoln (GB)

( * ) Notice: Subject to any disclaimer, the term of this patent is extended or adjusted under 35 U.S.C. 154(b) by 0 days.

(21) Appl. No.: 17/889,886

(22) Filed: Aug. 17, 2022

(65) Prior Publication Data
US 2022/0394922 A1  Dec. 15, 2022

Related U.S. Application Data

(63) Continuation of application No. 16/471,600, filed as application No. PCT/GB2017/053789 on Dec. 18, 2017, now Pat. No. 11,533,843.

(30) Foreign Application Priority Data

Dec. 21, 2016 (GB) ........................... 1621879
Aug. 31, 2017 (GB) ........................... 1713953

(51) Int. Cl.
*A01D 41/127* (2006.01)
*A01D 17/00* (2006.01)
(Continued)

(52) U.S. Cl.
CPC ........... *A01D 41/127* (2013.01); *A01D 17/00* (2013.01); *A01D 33/00* (2013.01); *A01D 43/087* (2013.01);
(Continued)

(58) Field of Classification Search
None
See application file for complete search history.

(56) References Cited

U.S. PATENT DOCUMENTS

| 4,441,794 A | 4/1984 | Field |
| 6,205,384 B1 | 3/2001 | Diekhans |

(Continued)

FOREIGN PATENT DOCUMENTS

| CN | 106000904 A | 10/2016 |
| CN | 107027411 A | 4/2018 |

(Continued)

OTHER PUBLICATIONS

Kabir, Md Shaha Nur, Swe, Khine Myat, et al. "Sensor Comparison for Yield Monitoring Systems of Small-Sized Potato Harvesters," Proceedings of the 14th International Conference on Precision Agriculture Jun. 24-Jun. 27, 2018, 11 pages.

(Continued)

*Primary Examiner* — Hung Q Dang
(74) *Attorney, Agent, or Firm* — Price Heneveld LLP

(57) ABSTRACT

A harvester monitoring system configured to determine one or more parameters associated with harvested items, the system comprising: a camera module having a field of view and configured to generate image data associated with the harvested items; a mounting bracket configured to secure the camera module to a harvester such that a conveyor of the harvester is within the field of view of the camera module; a location sub-system configured to determine and output location data representative of a geographical location of the (Continued)

harvester monitoring system; and a processing unit configured to receive the image data and the location data, to determine one or more parameters associated with the harvested items, and to record the one or more parameters in association with the location data on a computer readable medium.

16 Claims, 26 Drawing Sheets

(51) Int. Cl.
    *A01D 33/00*     (2006.01)
    *A01D 43/08*     (2006.01)
    *A01D 69/00*     (2006.01)
    *A01D 91/00*     (2006.01)

(52) U.S. Cl.
    CPC ........ *A01D 91/00* (2013.01); *A01D 2033/005* (2013.01)

(56) References Cited

U.S. PATENT DOCUMENTS

| | | |
|---|---|---|
| 9,743,574 B1 | 8/2017 | Maxton et al. |
| 2005/0031166 A1 | 2/2005 | Fujimura et al. |
| 2005/0058337 A1 | 3/2005 | Fujimura et al. |
| 2006/0191251 A1 | 8/2006 | Pirro et al. |
| 2012/0306876 A1 | 12/2012 | Shotton |
| 2015/0124054 A1 | 5/2015 | Darr et al. |
| 2018/0042176 A1 | 2/2018 | Obropta et al. |
| 2018/0077384 A1 | 3/2018 | Goldman et al. |
| 2018/0220589 A1 | 8/2018 | Burden |
| 2018/0260601 A1 | 9/2018 | Brebner |

FOREIGN PATENT DOCUMENTS

| | | | |
|---|---|---|---|
| DE | 8234000 U1 | 3/1982 | |
| DE | 602004011373 | 7/2008 | |
| DE | 102013112080 A1 | 5/2015 | |
| DE | 202015102277 U1 | 7/2015 | |
| EP | 0928554 A1 | 7/1999 | |
| EP | 2098109 A1 * | 9/2009 | ........... A01D 43/085 |
| EP | 2183954 A1 | 5/2010 | |
| EP | 2197171 A2 | 6/2010 | |
| EP | 2529610 A1 | 5/2012 | |
| EP | 2698763 A1 | 2/2014 | |
| GB | 2531908 A | 5/2016 | |
| JP | 09220010 A | 8/1997 | |
| JP | 2013074807 A | 4/2013 | |
| WO | 8605353 A1 | 9/1986 | |
| WO | 2016127094 A1 | 11/2016 | |
| WO | 2018035082 A1 | 2/2018 | |

OTHER PUBLICATIONS

Chung, S. O., Choi, M. C., Lee, K. H., Kim, Y. J., Hong, S. J., Li., M., et al. (2016). "Sensing technologies for grain crop yield monitoring systems: A review. Journal of Biosystems Engineering," 41(4), 408-417.
Demmel, M. & Auernhammer, H. (1999). "Local yield measurement in a potato harvester and overall yield patterns in a cereal-potato crop rotation." ASAE Paper No. 991149. St. Joseph, Mich.: ASAE.
Ehlert, D. (2000). "Measuring mass flow by bounce plate for yield mapping of potatoes." Precision Agriculture, 2(2), 119-130.
Hofstee, J. W. & Molema, G. J. (2003). "Volume estimation of potatoes partly covered with dirt tare." ASAE Annual Meeting, Paper No. 031001, 2003, DOI: 10.13031/2013.15380, 13 pages.
Pelletier, G., & Upadhyaya, S. K. (1999). "Development of a tomato load/yield monitor." Computers and Electronics in Agriculture, 23, 103-117.
Persson, D. A., Eklundh, L., Algerbo, P. A., et al. (2004). "Evaluation of an optical sensor for tuber yield monitoring." Transactions of the ASAE, 47(5), 1851-1856.
Qarallah, B., Shoji, K., Kawamura, T., et al. (2008). "Development of a yield sensor for measuring individual weights of onion bulbs." Biosystems Engineering, 100, 511-515.
Shoji, K., Kawamura, T., Horio, H., et al., (2002). "Impact-based grain yield sensor with compensation for vibration and drift." Journal of Japanese Society of Agricultural Machinery, 64(5), 108-115.
Thomas, D. L., Perry, C. D., Vellidis, G., Durrence, J. S., Kutz, L. J., Kvien, C. K., Boydell, B., Hamrita, T. K., et al. (1999). "Development and implementation of a load cell yield monitor for peanut." Applied Engineering in Agriculture, 15(3), 211-216.
Thomasson, J. A., Sui, R., Wright, G. C., Robson, A. J., et al. (2006). "Optical peanut yield monitor: development and testing." Applied Engineering in Agriculture, 22(6), 809-818.
Gogineni S., Thomasson, J.A., Wooten, J.R., White, J.G., Thompson, P.R., Shankle M. etal (2002) "Image-based sweetpotato yield and grade monitor." ASAE Paper No. 021169. St. Joseph, Mich.; ASAE.
Hofstee, J.W. & Molema, G.J. (2002). "Machine vision based yield mapping of potatoes." ASAE Paper No. 021200. St. Joseph, Mich.; ASAE.
Tokunaga, J. & Shoji, K. "Development of potato yield sensor to measure the mass of individual tubers." Preprints of Third IFAC International Workshop on Bio-Robotics, Information Technology and Intelligent Control for Bioproduction Systems (Bio-Robotics III), Sep. 9-10, 2006, pp. 239-243.
Chinese Office Action, Application No. 201780086723.X, Jun. 6, 2022, 22 pages.
EP Opposition, Application No. 17817849.7, Jul. 26, 2022, 49 pages.
Sang Shin, Ik et al., "Conveyor Visual Tracking Using Robot Vision," 2006 Florida Conference on Recent Advances in Robotics, FCRAR 2006, Apr. 2006, pp. 1-5, <https://www.researchgate.net/publication/228670939_conveyor_visual_tracking_using_robot_vision>.
Arif, Omar et al., "Tracking and Classifying Objects on a Conveyor Belt Using Time-of-Flight Camera," 27th International Symposium on Automation and Robotics in Construction (ISARC 2010), Jun. 2010, DOI:10.22260/ISARC2010/022.
Weis, Martin et al., "Analysis of Product Demixing on the Preparation Base in a Combine Harvester by Means of High-Speed Image Exposures," Bornimer Agricultural Technical Reports, Heft 81, S. 170 ff, ISSN 0947-7314, Leibnitz Institute for Agricultural Engineering (ATB), 19th Workshop Computer Image Analysis in Agriculture and 2nd Workshop Unmanned Autonomous Flying Systems in Agriculture, 2013.
Moonrinta, J. et al., "Fruit Detection, Tracking, and 3D Reconstruction for Crop Mapping and Yield Estimation," 2010 11th International Conference on Control Automation Robotics & Vision, IEEE, Dec. 2010, pp. 1181-1186, DOI:10.1109/ICARCV.2010.5707436.
Lont, J.J., "Yield mapping of potatoes with machine vision," Thesis Farm Technology, Jun. 2006, 97 pages.
Hassanzadeh, Iraj, "Fixed-Camera Visual Servoing of Moving Object Using an Event-Based Path Generation," Proceedings of the 10th WSEAS International Conference on Systems, Vouliagmeni, Athens, Greece, Jul. 10-12, 2006, pp. 180-184, <https://www.semanticscholar.org/pa-per/Fixed-camera-visual-servoing-of-moving-object-using-Hassanzadeh-Jabbari/c4blec9f618c909a67c227b8d7d72eb94d025238>.
Runge, Remco, "Mobile 3D Computer Vision: Introducing a portable system for potato size grading," Master Thesis, Radboud University, Dec. 10, 2014.
Kazmi et al., "Indoor and Outdoor Depth Imaging of Leaves With Time of Flight and Stereo Vision Sensors: Analysis and Comparison," ISPRS Journal of Photogrammetry and Remote Sensing, vol. 88, pp. 128-146, Feb. 2014, DOI:10.1016/j.isprsjprs.2013.11.012.
Marinello, Francesco, "Kinect 3D reconstruction for quantification of grape bunches volume and mass," Conference: Engineering for Rural Development, Jelgava, Lettland, vol. 15, May 2016, 8 pages.

(56) References Cited

OTHER PUBLICATIONS

Excerpt from the Cambridge Dictionary relating to the English term "Categorize.".
Excerpt from the Cambridge Dictionary relating to the English term "Grade.".
Opposition Against EP3557972B1, Owner: B-Hive Innovations Limited, Opponent: Grimme Landmaschinenfabrik GmbH & Co. KG, Jun. 22, 2021, pp. 1-82.
International Search Report and Written Opinion of the International Searching Authority, dated Mar. 29, 2018, for International Application No. PCT/GB2017/053789 filed Dec. 18, 2017, 5 pages.
EP Search Report, Application No. 20188882.3, Dated Nov. 26, 2020, 9 pages.
Office Action, Chinese Application No. 201780086723.X, Jan. 3, 2023, 24 pages.
Opposition Against EP 3557972B1, Owner: B-Hive Innovations Limited, Opponent: Grimme Landmaschinenfabrik GmbH & Co. KG, May 2, 2023, 57 pages.
Opposition Against EP 3557972B1, Owner: B-Hive Innovations Limited, Opponent: Grimme Landmaschinenfabrik GmbH & Co. KG, May 8, 2023, 33 pages.
English Translation of Opposition Against EP 3557972B1, Owner: B-Hive Innovations Limited, Opponent: Grimme Landmaschinenfabrik GmbH & Co. KG, May 2, 2023, 27 pages.

* cited by examiner

CROP MONITORING SYSTEM AND METHOD

CROSS-REFERENCE TO RELATED APPLICATIONS

This application is a continuation of U.S. patent application Ser. No. 16/471,600 filed Jun. 20, 2019, and entitled "A CROP MONITORING SYSTEM AND METHOD" which claims priority to International Application No. PCT/GB2017/053789, filed on Dec. 18, 2017, entitled "A CROP MONITORING SYSTEM AND METHOD," which claims the benefit of United Kingdom Patent Application GB 1621879.4, filed on Dec. 21, 2016, entitled "A CROP MONITORING SYSTEM AND METHOD," and United Kingdom Patent Application GB 1713953.6, filed on Aug. 31, 2017, entitled "A CROP MONITORING SYSTEM AND METHOD," the disclosures of which are all hereby incorporated herein by reference in their entirety.

BACKGROUND

Embodiments of the present disclosure relate to systems and methods for monitoring harvesters and crops. More specifically, some embodiments are directed to systems and methods for monitoring, at the harvesting stage, one or more parameters associated with one or more harvested items (such as root vegetables).

The assessment of parameters associated with some crops before they are harvested is difficult. This is especially the case for root vegetables such as potatoes. In particular, it is difficult to determine parameters such as the size of such root vegetables before the root vegetables are harvested because they are underground.

In order to determine such parameters, a farmer has conventionally harvested root vegetables from one or more sample sections of a field, analysed the or each harvested sample to determine the parameters for the or each sample, and then extrapolated those results to estimate the parameters of the root vegetables for a larger area—e.g. the field from which the or each sample was taken.

This process is prone to errors, however. In particular, the or each sample may not be representative of the larger area.

Typically, as the root vegetables are processed for sale, they are assessed—e.g. through the use of sieves—to determine one or more parameters such as size. Mismatches between the expected and actual parameters can have consequences on the sale, management, handling, and storage of the root vegetables.

Better determining of one or more parameters associated with root vegetables can allow more of a crop to be used.

Determining the one or more parameters early in the harvesting process can enable more efficient processing and asset management.

Determining the one or more parameters for root vegetables from a known location can allow more detailed analysis of the growing conditions in that known location and how these impact the one or more parameters. This, in turn, can allow the growing conditions to be controlled to improve one or more of the one or more parameters.

The same or similar issues arise in relation to other harvestable items, other than root vegetables.

Accordingly, embodiments seek to alleviate one or more problems associated with the prior art.

BRIEF SUMMARY

An aspect of the present disclosure provides a harvester monitoring system configured to determine one or more parameters associated with one or more harvested items, the system comprising: a camera module having a field of view and configured to generate image data associated with the one or more harvested items; a mounting bracket configured to secure the camera module to a harvester such that a conveyor of the harvester is within the field of view of the camera module; a location sub-system configured to determine and output location data representative of a geographical location of the harvester monitoring system; and a processing unit configured to receive the image data and the location data, to determine one or more parameters associated with the one or more harvested items, and to record the one or more parameters in association with the location data on a computer readable medium.

The camera module may be configured to determine depth data for the one or more harvested items.

The depth data may be a depth map.

The camera module may include a stereoscopic camera.

The camera module may include a visible light camera, an infra-red transmitter, and an infra-red receiver, and the depth data is determined by analysis of a distortion pattern of infra-red light emitted by the infra-red transmitter and received by the infra-red receiver.

The camera module may include a shroud configured to shield a camera of the camera module from ambient light.

The shroud may include a downwardly and outwardly extending skirt at a part of the shroud which is remote from the camera of the camera module.

The harvester monitoring system may further include a protective case in which the camera module is housed, wherein the protective case may be configured to shield the camera module from one or more of fluid, dirt, and vibration.

The mounting bracket may be an adjustable bracket which is configured to allow the height of the camera module from the conveyor to be adjusted.

The mounting bracket may include at least one mounting beam member with one or more mounting hooks associated therewith, the one or more mounting hooks being configured to engage at least part of the harvester.

The one or more mounting hooks may include at least one mounting hook which is telescopically secured to the at least one mounting beam member.

The location sub-system may include a satellite-based location system module which is configured to receive signals from a satellite-based location system.

The processing unit may be configured to depth filter the image data to exclude or delete parts of the image data which are more than a maximum distance away from the camera module.

The processing unit may be configured to depth filter the image data to exclude or delete parts of the image data which are less than a minimum distance away from the camera module.

The processing unit may be configured to segment the image data into at least one portion which represents one of the one or more harvested items.

The one or more parameters may include size information.

The size information may include one or both of a dimension of the one or more harvested items and a weight of the one or more harvested items.

The processing unit may be configured to categorise the one or more harvested items based on the size information.

The processing unit may be configured to categorise the one or more harvested items by determining whether the one or more harvested items would pass through a sizing aperture of a virtual sieve base on the sizing information.

The harvester monitoring system may further include a communication sub-system which may be configured to transmit the one or more parameters in association with the location data to a remote management system.

The harvester monitoring system may further include a power sub-system which may include one or more batteries which are used to compensate for variations in electrical power delivered to the monitoring system by an electrical system of the harvester or to provide the monitoring system with electrical power which has a higher voltage than a voltage of the electrical power delivered by the electrical system of the harvester.

The location information may be indicative of the location at which the one or more harvested items were harvested.

Another aspect provides a harvester including a harvester monitoring system as above.

The harvester monitoring system may be carried by the harvester.

Another aspect provides a monitoring method to determine one or more parameters associated with one or more harvested items, the method comprising: generating image data associated with one or more harvested items using a camera module having a field of view, the camera module being secured by a mounting bracket to a harvester such that a conveyor of the harvester is within the field of view of the camera module; determining and outputting location data representative of a geographical location of the harvester monitoring system using a location sub-system; receiving the image data and the location data at a processing unit; determining one or more parameters associated with the one or more harvested items at the processing unit based on the received image data; and recording, using the processing unit, the one or more parameters in association with the location data on a computer readable medium.

The monitoring method may further include: generating a graphical representation in the form of a map indicating the one or more parameters at locations based on the location data.

Another aspect provides a computer readable medium having instructions stored thereon which, when executed by a processing unit, cause the method as above to be performed.

BRIEF DESCRIPTION OF THE SEVERAL VIEWS OF THE DRAWINGS

Embodiments of the present disclosure are described, by way of example only, with reference to the accompanying drawings, in which.

DETAILED DESCRIPTION

Embodiments may include a monitoring system 1 which is configured to determine one or more parameters associated with one or more harvested items 21.

Figure 6:
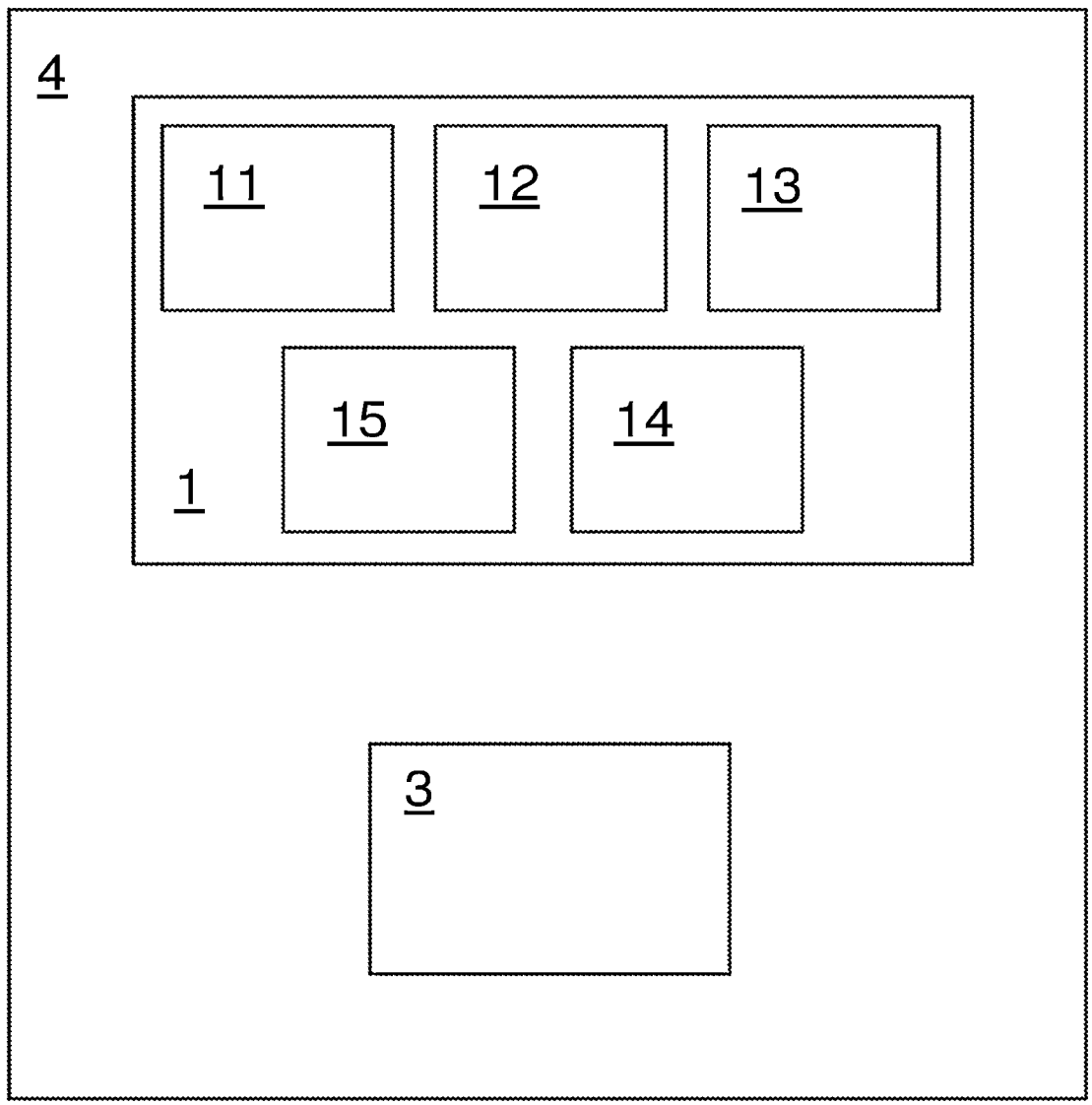
FIG. 6 shows a schematic view of a monitoring system according to some embodiments.

The monitoring system 1 (see FIG. 6, for example) includes an imaging sub-system 11 which is configured to determine the one or more parameters. The monitoring system 1 may include one or more of: a storage sub-system 12, a communication sub-system 13, a location sub-system 14, and a power sub-system 15.

The location sub-system 14 may be configured to determine the current location of the monitoring system 1 (or a part thereof). This location may be a longitude and latitude, for example. In some embodiments, the location may be a location relative to a fixed geographical location.

The storage sub-system 12 may be configured to store the one or more parameters and/or the current location (as determined by the location sub-system 14, if provided). The storage sub-system 12 may be further configured to store other information, as will be apparent from this description.

The communication sub-system 13 may be configured to transmit the one or more parameters and/or the current location (as determined by the location sub-system 14, if provided) to a remote management system 3.

The power sub-system 15 may be configured to provide electrical power to one or more (or all) components of the monitoring system 1.

The monitoring system 1 may be configured to be carried by a harvester 100. The harvester 100 may be configured to harvest the one or more harvested items 21 from one or more harvestable items 22. The harvester 100 may be configured, therefore, to move relative to the one or more harvestable items 22 in order to harvest those one or more items 22 into one or more harvested items 21. As will be understood, a harvestable item 22 is an item awaiting harvesting and that harvestable item 22 will become a harvested item 21 once harvested by the harvester 100. The one or more harvestable items 22 may be arranged in a field 200 and is a crop.

Collectively, the monitoring system 1 and the remote management system 3 (of provided) may be referred to as a monitoring and management system 4.

Figure 1:
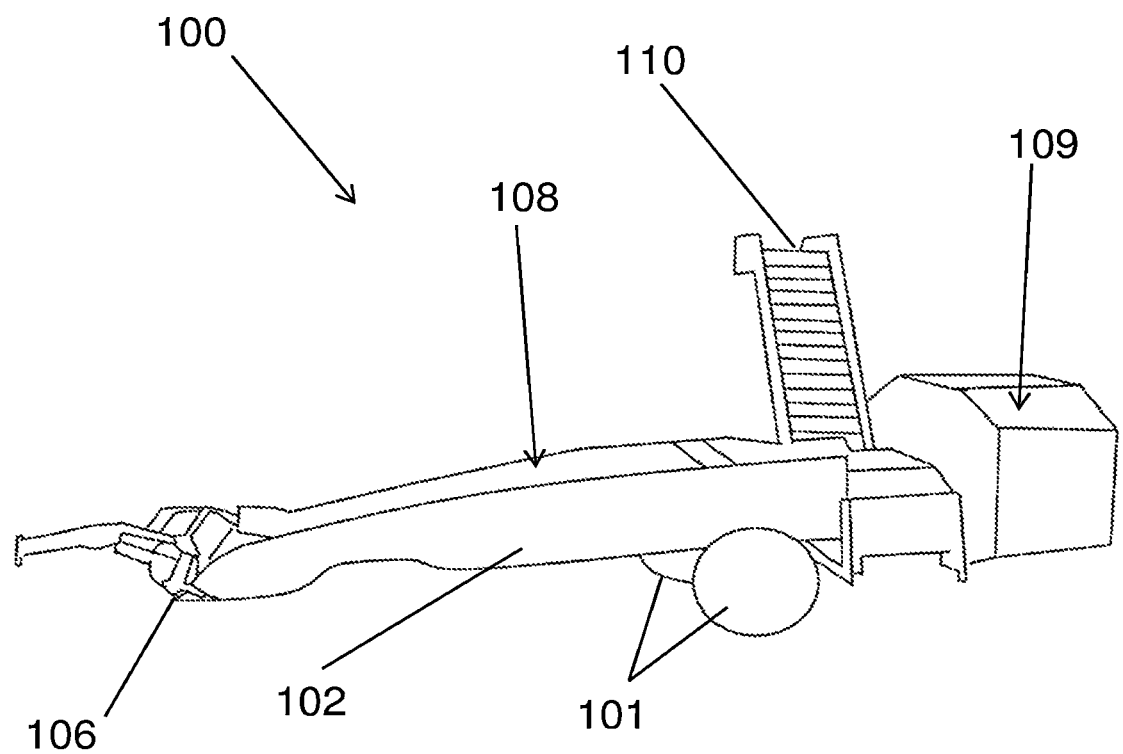
FIG. 1 shows a harvester according to some embodiments.
Figure 2:
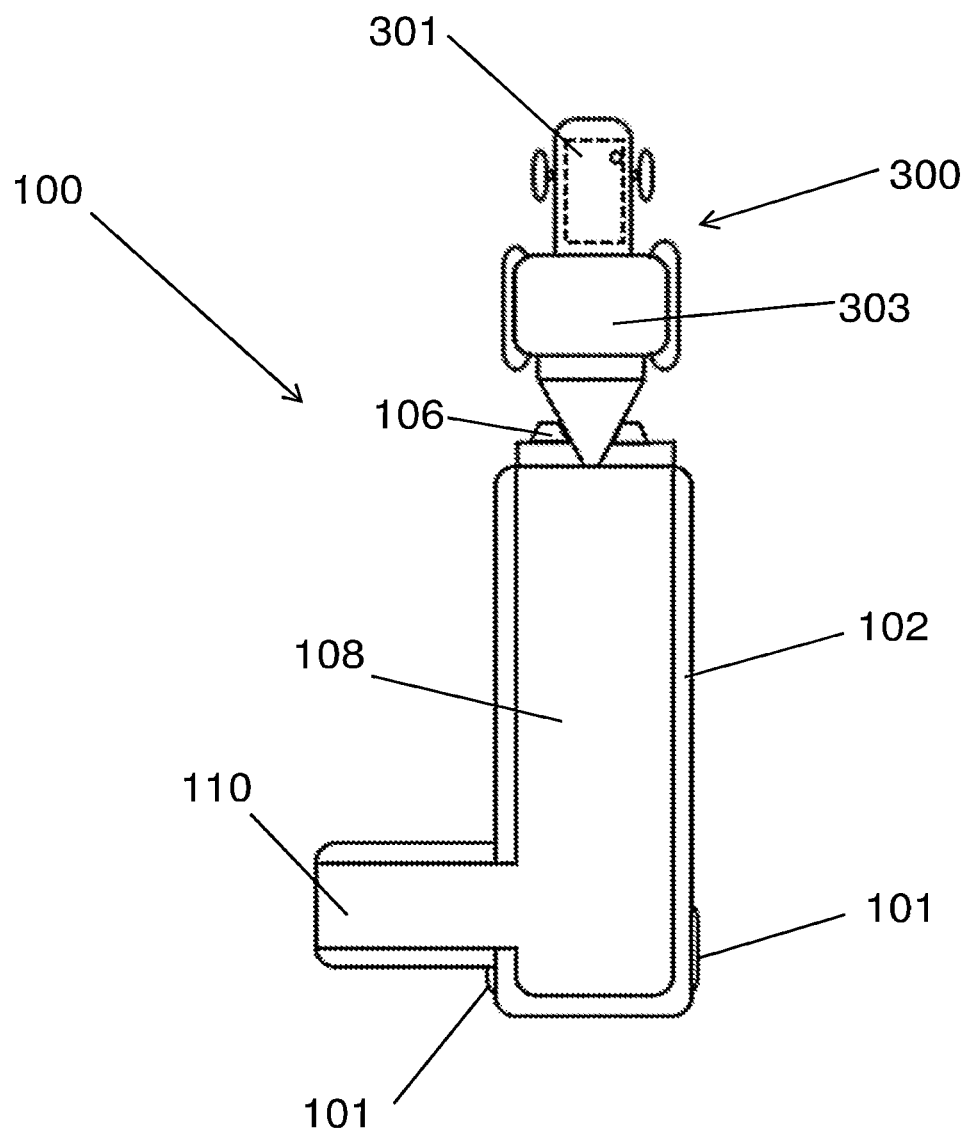
FIG. 2 shows a harvester according to some embodiments.

The harvester 100 could take a number of different forms. For example, the harvester 100 may be a self-propelled harvester 100 (see FIG. 3, for example) or may be configured to be towed by another vehicle (such as a tractor 300)—see FIGS. 1 and 2, for example.

Accordingly, the harvester 100 may include a plurality of ground-engaging wheels 101 which are configured to support a body 102 of the harvester above a ground surface. The harvester 100 may include an engine 103 which, in the case of a self-propelled harvester 100, is configured to drive rotation of one or more of the ground-engaging wheels 101 and/or which is configured to drive operation of one or more other parts of the harvester 100 (which may also be the case in relation to a towed harvester 100).

Figure 26:
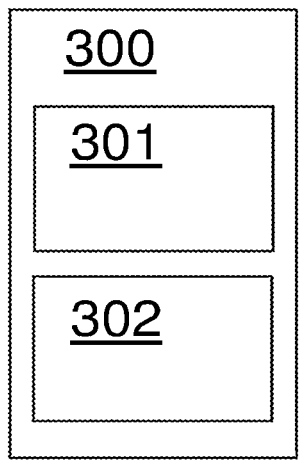
FIG. 26 shows a schematic view of a tractor according to some embodiments.

In some embodiments, the harvester 100 is a towed harvester 100 (such as in FIGS. 1 and 2) and receives electrical and/or mechanical power from the towing vehicle (e.g. from the tractor 301). In some embodiments, the towing vehicle (such as a tractor 300) includes an engine 301 and an electrical system 302 (see FIG. 26, for example) which may be mechanically and electrically coupled, respectively, to the harvester 100.

The harvester 100 may include a cab 104 which may be part of the body 102 and from which an operator may control the operation of the harvester 100—including, for example, steering and controlling the operation of the engine 103. References to the cab 104 of the harvester 100 may be references to a cab or control panel of a towed harvester 100, or to a cab 104 of a self-propelled harvester 100, and are to be construed as encompassing a cab 303 of the towing vehicle (e.g. the tractor 300) in embodiments including such a vehicle.

Figure 25:
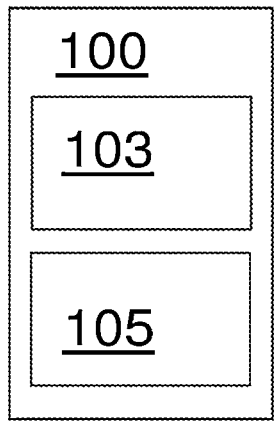
FIG. 25 shows a schematic view of a harvester according to some embodiments.
Figure 27:
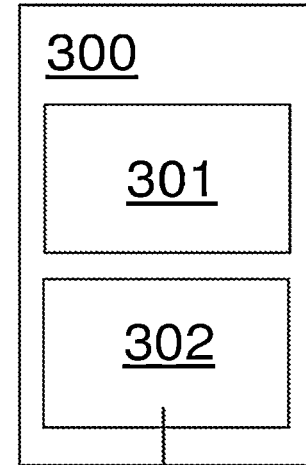
FIG. 27 shows a schematic view of a harvester and tractor according to some embodiments.
Figure 27:
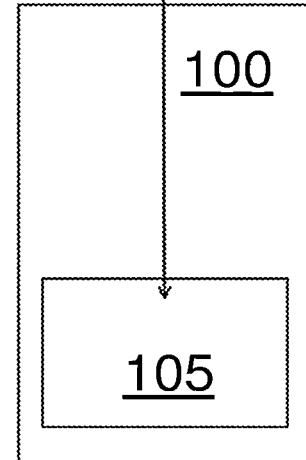

The harvester 100 may include an electrical system 105 (see FIG. 25, for example) which is configured to provide electrical power to one or more parts of the harvester 100 (e.g. to drive the operation of one or more electric motors). The electrical system 105 may include one or more batteries for the storage of electrical power and/or an alternator or other generator coupled to the engine 103 to generate electricity. In embodiments including a towing vehicle (such as the tractor 300), the electrical system 105 of the harvester 100 may be electrically coupled to the electrical system 302 of the tractor 300 (or other vehicle) to allow the harvester 100 to be at least partially powered by the tractor 300 (or other vehicle)—see FIG. 27, for example.

The harvester 100 is configured for the harvesting of the one or more harvestable items 22. In some embodiments, the one or more harvestable items 22 are root vegetables which are buried underground. The one or more harvestable items 22 may include, for example, potatoes or carrots.

Figure 3:
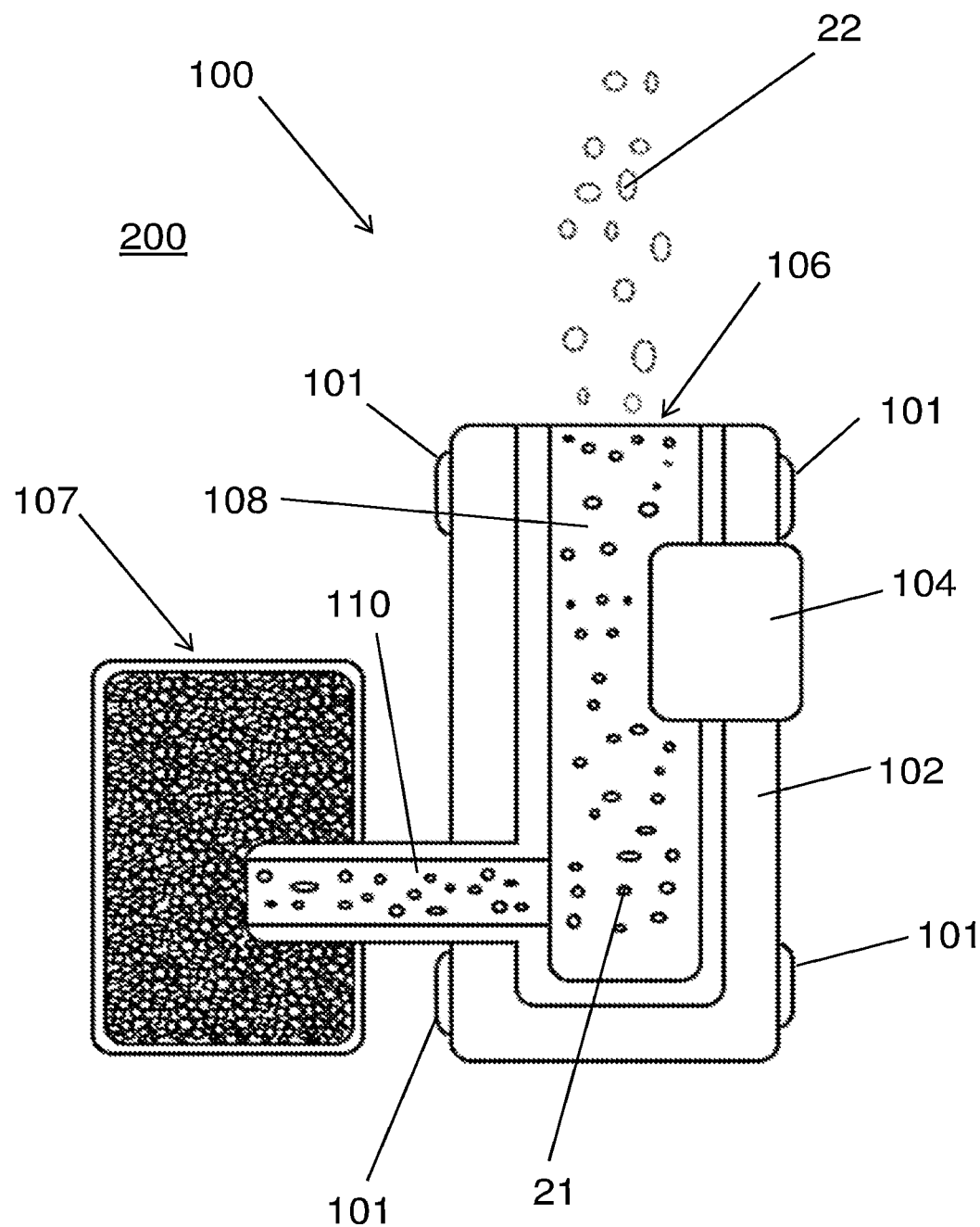
FIG. 3 shows a harvester according to some embodiments.
Figure 4:
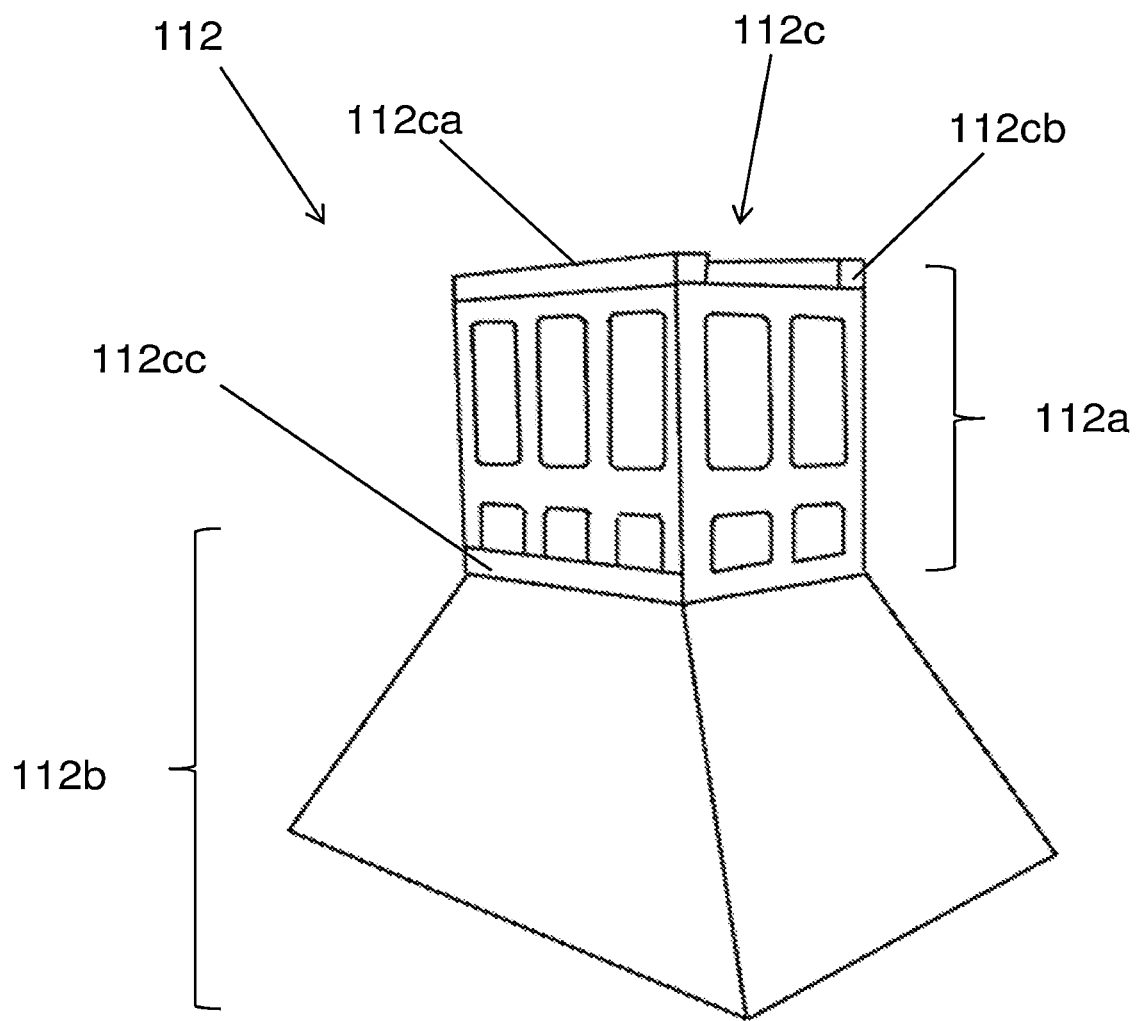
FIG. 4 shows a shroud according to some embodiments.
Figure 5:
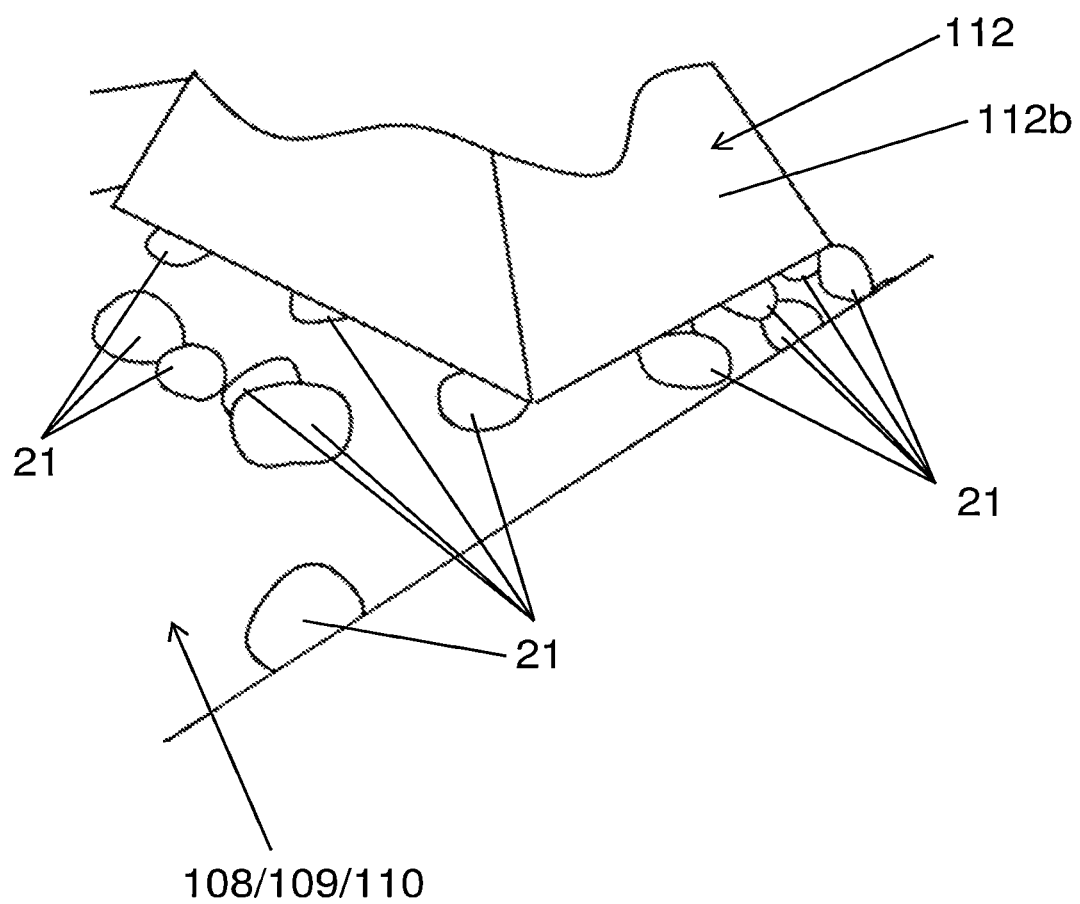
FIG. 5 shows part of a shroud and conveyor according to some embodiments.

The harvester 100 may, therefore, include a share 106 which is configured to lift the one or more harvestable items 22 from the ground (i.e. from the soil) and to convey the one or more items 22, which are now one or more harvested items 21, towards a container 107 (see FIG. 3, for example).

The harvester 100 may include a conveyor 108 to convey the one or more harvested items 21 from the share 106 towards the container 107.

The conveyor 108 may be in the form of a spaced series of slats or bars oriented perpendicular to the direction of travel of the conveyor 108 such that soil and other debris may pass between the slats or bars.

The harvester 100 may include a picking table 109 (see FIG. 1, for example) which may be part of the conveyor 108 (i.e. may be a generally flat section of the conveyor 108 which is accessible to one or more pickers). The or each harvested item 21 is conveyed by the harvester across the picking table 109 and one or more pickers may remove stones and other large debris manually. The picking table 109 is generally located upstream of the container 107 relative to the movement of the one or more harvested items 21 through the harvester 100 (the share 106 being located downstream of the picking table 109 and conveyor 108). The picking table 109 may include a canopy as shown in the example in FIG. 1. Although picking tables 107 are not depicted in relation to the harvesters 100 of FIGS. 2 and 3, they may be included in such harvesters 100 (with or without a canopy).

From the picking table 109 and/or conveyor 108, the one or more harvested items 21 may be transported to the container 107. This transportation may include the use of one or more further conveyors 110, for example.

In some embodiments, the container 107 is carried by a second vehicle (not shown) which is driven alongside the harvester 100. The second vehicle may be a self-propelled vehicle such as a tractor towing a trailer on which the container 107 is supported. As such the second vehicle may include a tractor generally identical or similar to the tractor 300.

In some embodiments, the container 107 is carried by the harvester 100.

As will be understood, the form of the harvester 100 may vary but will include a part relative to which the one or more harvested items 21 pass (or otherwise travel)—e.g. driven in their movement by the conveyor 108, picking table 109, or one or more further conveyors 110.

The monitoring system 1 may be carried or carried entirely by the harvester 100.

Figure 16:
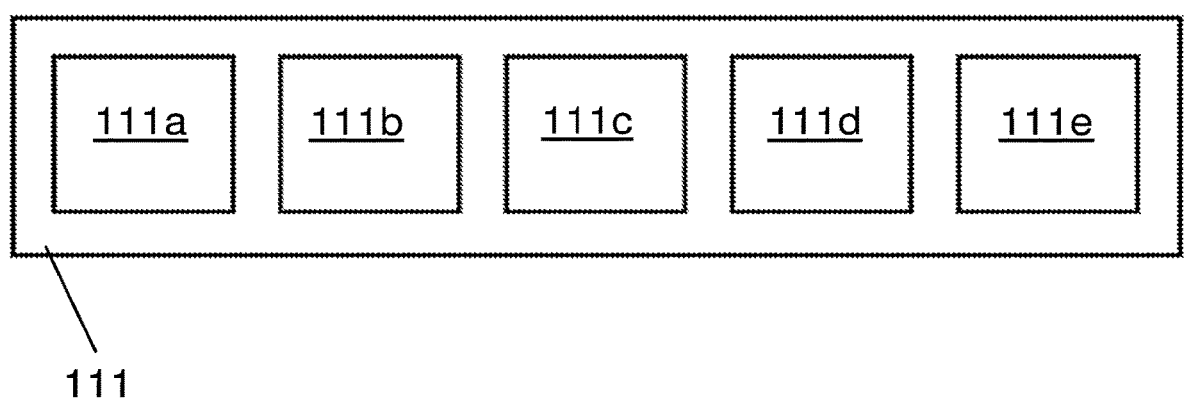
FIG. 16 shows a schematic view of a camera module according to some embodiments.

The imagining sub-system 11 may include a camera module 111 (see FIGS. 9, 10, and 16 for example) and a camera module mount (parts of examples of which are shown in FIGS. 4, 5, 7, and 8). The camera module 111 is configured to acquire one or more images of the one or more harvested items 21 and the camera module mount is configured to secure the camera module 111 with respect to at least part of the harvester 100.

The camera module mount may be configured to secure the camera module 111 with respect to the part of the harvester 100 relative to which the one or more harvested items 21 pass (or otherwise travel). In some embodiments, the camera module mount may be configured to secure the camera module 111 with respect to the conveyor 108, the picking table 109, or the one or more further conveyors 110.

The camera module mount is configured to secure the camera module 111 such that the one or more harvested items 21 pass through a field of view of the camera module 111.

The camera module mount may be configured to secure the camera module 111 such that the one or more harvested items 21 pass beneath the camera module 111 and the camera module mount may, therefore, secure the camera module 111 above the conveyor 108, the picking table 109, or the one or more further conveyors 110. As such, in these embodiments, the one or more harvested items 21 conveyed by the conveyor 108, the picking table 109, or the one or more further conveyors 110 may rest on the conveyor 108, the picking table 109, or the one or more further conveyors 110 as they are conveyed.

The camera module mount may include a shroud 112 (see FIGS. 4 and 5) which is configured to reduce the amount of ambient light to which an operative part of the camera module 111 is exposed—the operative part of the camera module 111 including a lens, for example. The shroud 112 may, therefore, reduce glare (and infra-red interference, see below) on the operative part of the camera module 111.

The shroud 112 includes a first part 112a and a second part 112b which are coupled together. The first part 112a is a proximal part and the second part 112b is a distal part. The first part 112a houses the operative part of the camera module 111 and may house a substantial part of the camera module 111 (or the whole camera module 111). The operative part of the camera module 111 may be located at a first end of the first part 112a, the first end being generally remote from the second part 112b of the shroud 112. The first end of the first part 112a may be generally closed such that light is inhibited or substantially prevented from entering an internal volume defined by the shroud 112 through the first end of the first part 112a.

The first part 112a may have a generally rectangular or square cross-section and may extend through a height.

The first part 112a may include a frame structure which carries one or more panels to provide the first part 112a of the shroud 112. The frame structure may be formed of a plastics material or metal, for example. The one or more panels may be secured to the frame structure by one or more connection members such as rivets or bolts.

The second part 112b of the shroud 112 may be attached to the first part 112a such that a second end of the first part 112a is adjacent a first end of the second part 112b. A second end of the second part 112b may be an open end (through which light may pass into the internal volume defined by the shroud 112.

The second part 112b of the shroud 112 may be in the form of a downwardly (and outwardly) extending skirt. A cross-sectional area of the second part 112b may increase from the first end thereof towards the second end thereof. The second part 112b may have a generally square or rectangular cross-section. The second part 112b may be formed from a plastics material or metal. The second part 112b may be self-supporting (e.g. such that no framework is required to support the second part 112b (other than that which may be provided in the first part 112a)).

The shroud 112 may include one or more fixtures 112c for a mounting bracket 113 of the imaging sub-system 11. The one or more fixtures 112c may include, for example, one or more beams 112ca, 112cb. The one or more fixtures 112c may be attached to an outer part of the first part 112a of the shroud 112. In some embodiments, the one or more fixtures 112c include at least one beam 112ca, 112cb which is attached to an outer part of the first end of the first part 112a. For example, the at least one beam 112ca, 112cb may be secured to an uppermost part of the shroud 112 (e.g. to a closed end thereof).

The one or more fixtures 112c may include one or more mounting plates 112cc which are located on a side surface of the first part 112a of the shroud 112. The or each mounting plate 112cc may be configured for securing to a mounting bracket 113 and/or for a part of the harvester 100—as described herein.

Figure 7:
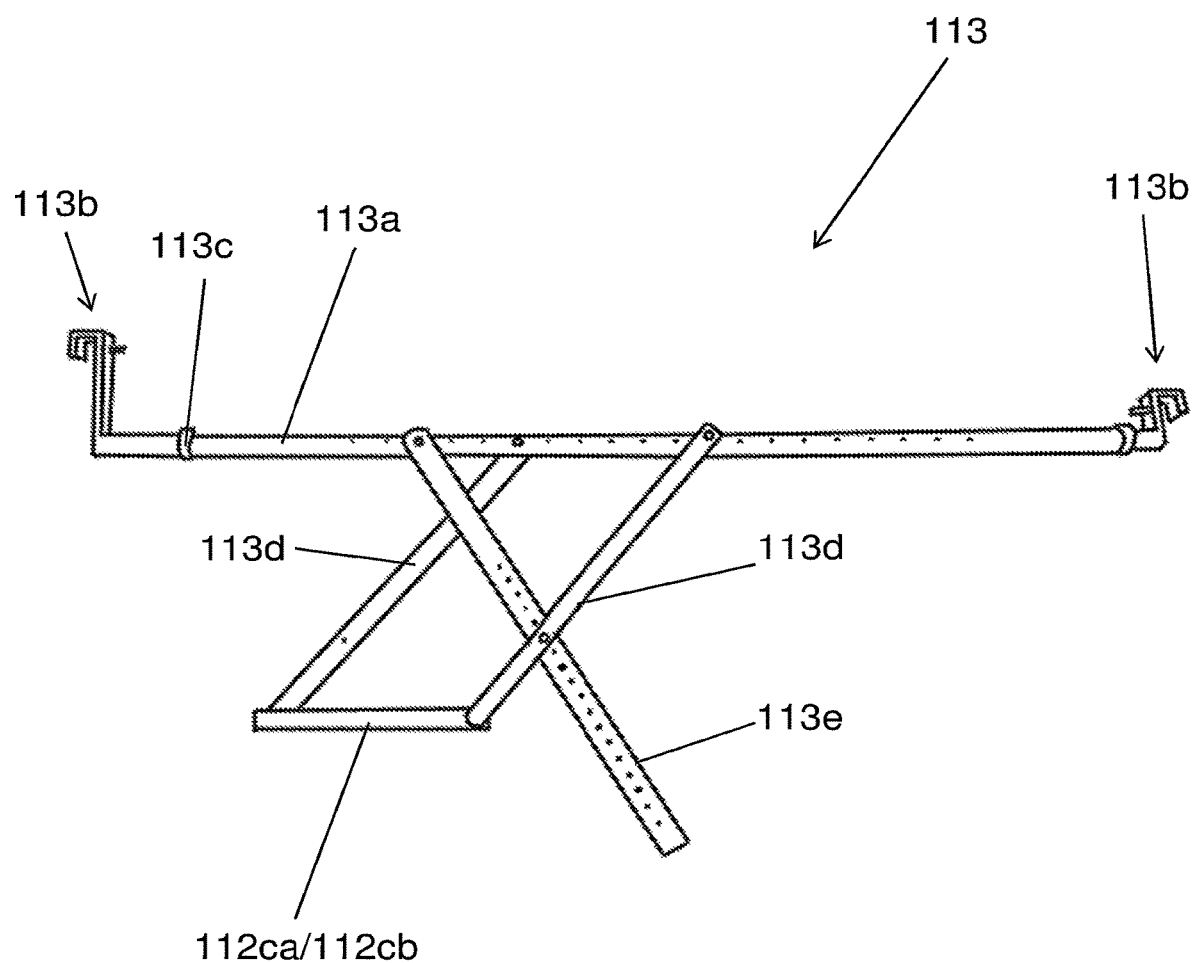
FIG. 7 shows part of a mounting bracket according to some embodiments.
Figure 8:
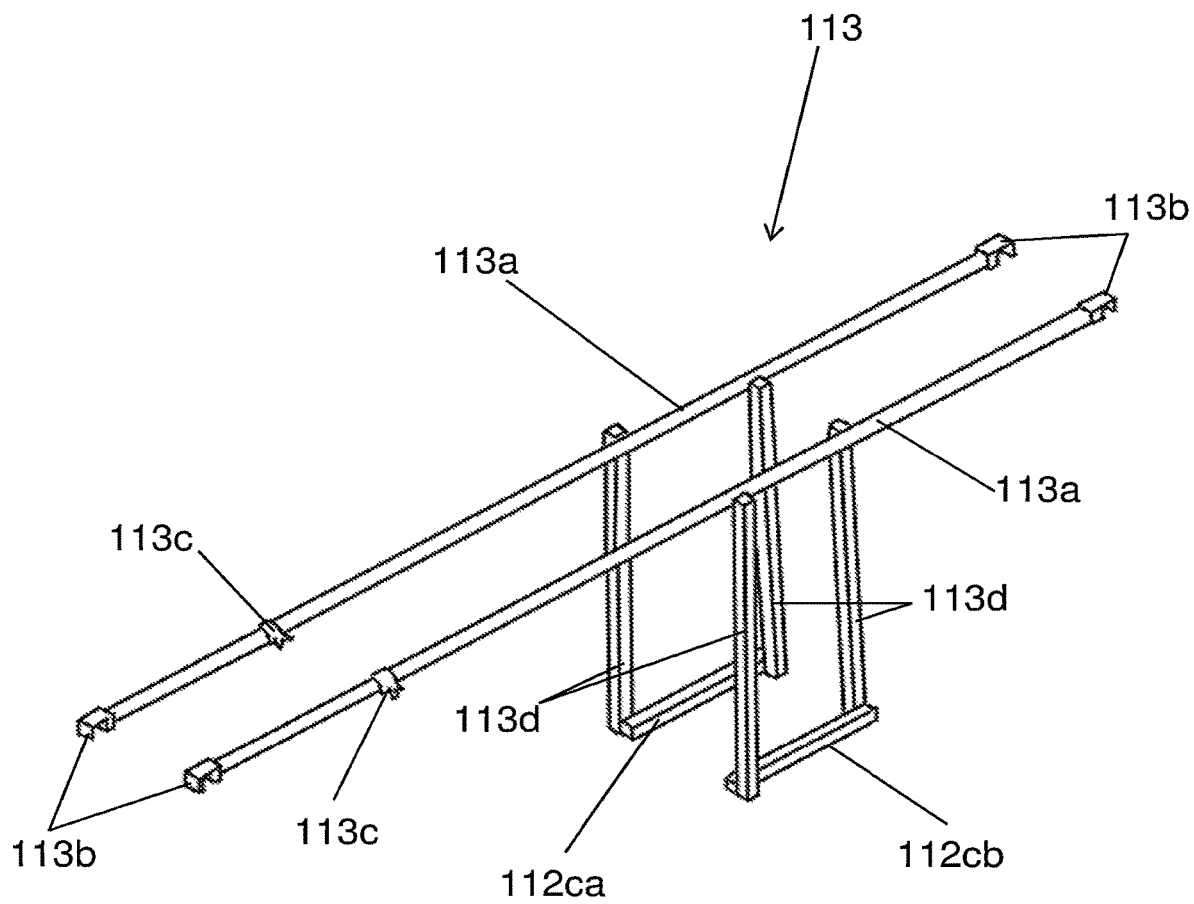
FIG. 8 shows part of a mounting bracket according to some embodiments.
Figure 9:
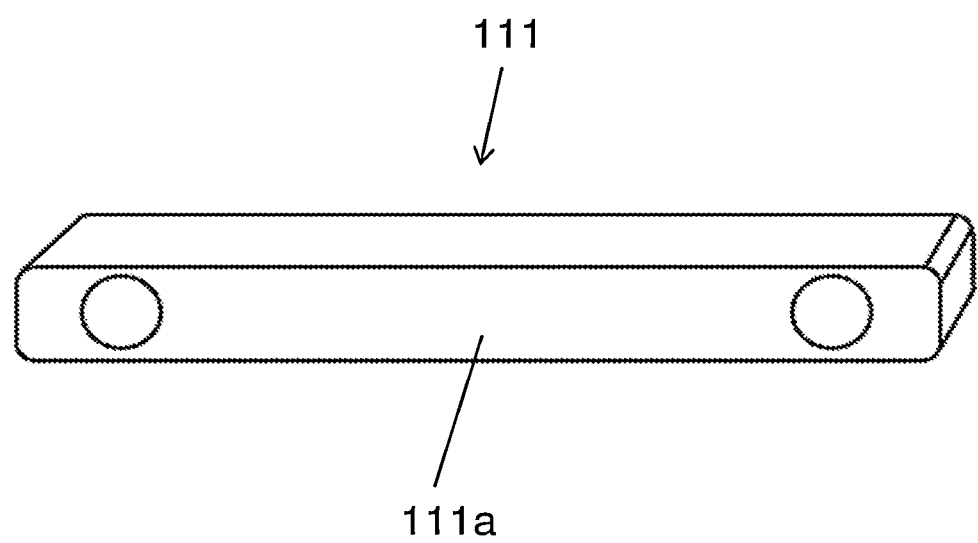
FIGS. 9 and 10 show camera modules according to some embodiments.

The mounting bracket 113 (an example of which is shown in FIGS. 7 and 8) may be part of the camera module mount of some embodiments. The mounting bracket 113 is configured to secure, at least in part, the camera module 111 and/or the shroud 112 to the harvester 100.

The mounting bracket 113 is configured, therefore, on the one hand to be secured to at least part of the harvester 100 and on the other hand to be secured to the cameral module 111 and/or the shroud 112.

The mounting bracket 113 may be configured to be secured in multiple different locations on a single harvester 100 and/or to multiple different variants of harvester 100. As such, the mounting bracket 113 may be an adjustable mounting bracket 113. This adjustability may include a height adjustment—i.e. to vary the relative position of the camera module 111 and/or shroud 112 with respect to a part of the mounting bracket 113 and/or the conveyor 108, the picking table 109, or the one or more further conveyors 110.

The mounting bracket 113 may include one or more mounting beam members 113a (and may include two such mounting beam members 113a which may be arranged in a generally parallel configuration). The or each mounting beam member 113a may be a tubular member.

The or each mounting beam member 113a may include two opposing ends which each carry a respective mounting hook 113b.

At least one respective mounting hook 113b of the or each mounting beam member 113a may be telescopically mounted to its mounting beam member 113a such that the mounting hook 113b may be moved between extended and retracted configurations with respect to the mounting beam member 113a. A lock member 113c for the or each telescopic mounting may be provided which is configured to lock the mounting hook 113b in a position between the extended and retracted configurations. The lock member 113c may comprise a threaded bolt which is configured to be received by a correspondingly threaded hole defined by the mounting beam member 113a. In an unlocked configuration the lock member 113c does not engage the mounting hook 113b to inhibit telescopic movement of the mounting hook 113b and in a locked configuration the lock member 113c extends through a part of the mounting beam member 113a to engage the mounting hook 113b to inhibit or substantially prevent telescopic movement of the mounting hook 113b.

Each mounting hook 113b may include a first portion which is configured to engage (e.g. be received by) the associated mounting beam member 113a. Each mounting hook 113b may include a second portion which extends substantially perpendicular to the mounting beam member 113a and away from the camera module 111. This first portion may provide a vertical offset for the mounting beam member 113a from a hook portion of each mounting hook 113b. Accordingly, the hook portion may be carried by the second portion and may be configured to engage a part of the harvester 100. In particular, the hook portion may be configured to engage a beam or other part of the harvester 100. The hook portion may include a locking pin which is configured to trap the beam or other part of the harvester 100 selectively within the hook portion.

The mounting bracket 113 may include may include a respective plurality of support arms 113d which are pivotally connected to each of the mounting beam members 113a. In some embodiments, the support arms 113d are also connected to the camera module 111 and/or shroud 112. Accordingly, a first end of each of the support arms 113d may be connected to one of the mounting beam members 113a and a second end of each of the support arms 113d may be connected to the camera module 111 and/or the shroud 112. In some embodiments, the second end of each of the support arms 113*d* may be connected to the one or more fixtures 112*c*. In some embodiments, two support arms 113*d* are connected to each beam 112*ca*, 112*cb* and those two support arms 113*d* may be connected to the same mounting beam member 113*a*. In some such embodiments, each of the two support arms 113*d* is connected to an opposing side of the mounting beam member 113*a* and the beam 112*ca*, 112*cb*.

The connection between the support arms 113*d* and the one or more fixtures 112*c* may be a pivotal connection.

The mounting bracket 113 may include one or more adjustment arms 113*e* which are pivotally connected (e.g. at a first end) to one of the one or more mounting beam members 113*a*. The or each adjustment arm 113*e* may be further connected to one of the support arms 113*d*. The one or more adjustment arms 113*e* may, therefore, include a plurality of attachment locations along a length thereof for selective attachment to the associated support arm 113*d* to which it is configured to be connected. A distance of the second ends of the support arms 113*d* from the relevant mounting beam member 113*a* may, therefore, be adjusted by use of the different attachment locations. Each attachment location may comprise an aperture defined through the adjustment arm 113*e* which is configured to receive a bolt or other member which is also configured to be received by an aperture defined by the associated support arm 113*d*.

In some embodiments, the or each mounting beam member 113*a* may include a respective plurality of securing locations. The securing locations may be arranged as an array, for example, along a length of the or each mounting beam member 113*a*. Each securing location may be an aperture defined through the mounting beam member 113*a*. Each securing location may be configured to secure one of the support arms 113*d* or an adjustment arm 113*e*.

Thus, through use of the adjustment arm 113*e* and pivoting the support arms 113*d* with respect to the associated mounting beam member 113*a*, the height of the camera module 111 may be adjusted and then locked in position.

The mounting bracket 113 may be used to secure the camera module 111 to the harvester 100 and to position the camera module 111 with respect to the part of the harvester 100 such that the one or more harvested items 21 is within the field of view of the camera module 111. In some embodiments, the mounting bracket 113 may be used in combination with the or each mounting plate 112*cc* to secure the camera module 111 to the harvester 100.

Other mounting systems are possible and may be tailored to match the configuration of the harvester 100.

The camera module 111 may include a stereoscopic camera 111*a* (see FIG. 9) which is configured to capture images of its field of view. The stereoscopic camera 111*a* may be configured to capture pairs of images at substantially the same time to provide parallax in order to provide depth information.

Figure 10:
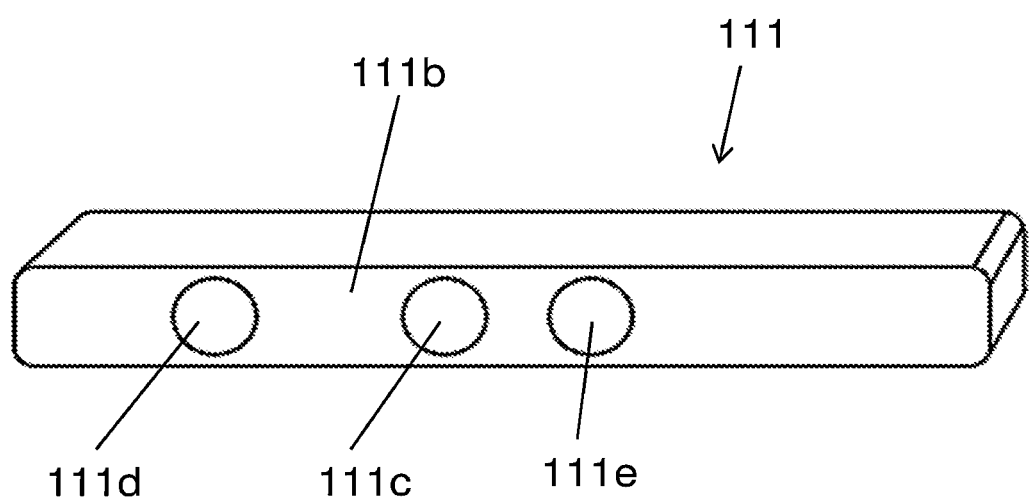

In some embodiments, see FIG. 10 for example, the camera module 111 may include a camera 111*c* which is configured to capture a visible light image and may include an infra-red transmitter 111*d* along with an infra-red receiver 111*e*. The infra-red transmitter 111*d* may include an infra-red laser whose emitted light output is directed though one or more optical elements (such as diffraction gratings) to spread the emitted light over a relatively wide area (e.g. in the field of view of the camera module 111)—e.g. in a speckle pattern. The infra-red receiver 111*e* may be configured to capture an image of the field of view of the camera module 111 in the infra-red light spectrum. By comparing the emitted infra-red light pattern with the received infra-red light pattern captured by the infra-red receiver 111*e* depth information can be determined by analysing distortions (i.e. a distortion pattern) of the infra-red light (e.g. by generating a disparity map). Such techniques are used, for example, in the Kinect(®) camera by Microsoft Corporation.

The imaging sub-system 11 (e.g. the camera module 111) may include an illumination device 111*b* which is configured to illuminate the field of view (and which may illuminate the interior of the shroud 112).

The camera module 111 and/or the illumination device 111*b* (if provided separately) may be provided with a protective case configured to shield the camera module 111 from one or more of fluid (e.g. water), dirt, and vibration. The protective case may have internal padding to support the camera module 111 and/or illumination device 111*b*. The protective case may have at least a portion which is transparent in order to allow the camera module 111 to capture images therethrough.

Figure 19:
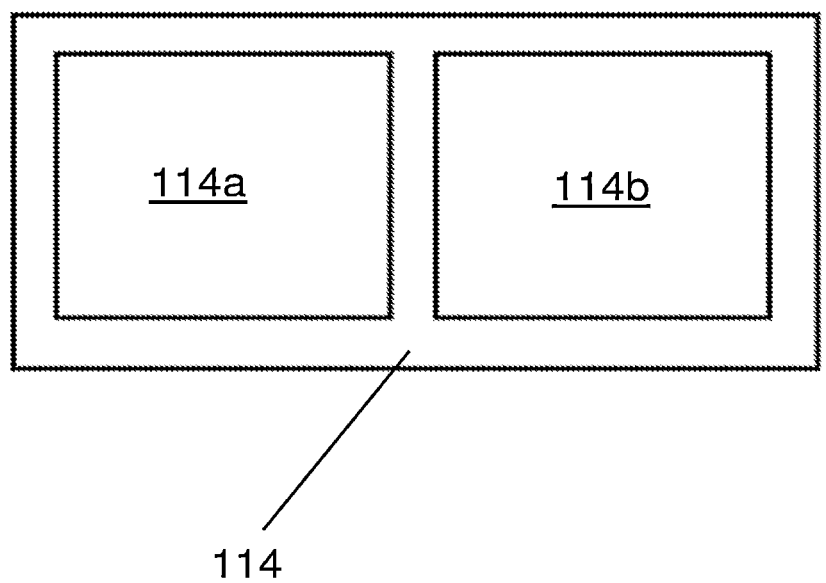
FIG. 19 shows a schematic view of a processing unit according to some embodiments.

The imaging sub-system 11 may include a processing unit 114 (see FIG. 19 for example) which is configured to receive a signal representative of one or more images captured by the camera module 111 (the camera module 111 being configured to output such a signal to the processing unit 114). The processing unit 114 and camera module 111 are, therefore, communicatively coupled. In some embodiments, this communicative coupling is via a wireless or a wired communication system.

The processing unit 114 include a processor 114*a* which is configured to execute one or more instructions which may be stored, as a computer program, on a memory of the processing unit 114*b*. This memory 114*b* may include volatile and/or non-volatile memory. The processing unit 114 may be, for example, a computer system and could be a laptop, a desktop computer, a tablet, a mobile (cellular) telephone, a small form factor computer, or the like.

In some embodiments, the one or more instructions are stored on a non-transitory computer readable medium.

The processing unit 114 may be configured to store images or parts of images, captured by the camera module 11 and sent to the processing unit 114, in the memory 114*b* as image data. The one or more instructions, when executed, may perform one or more processes on the images as described herein.

Figure 20:
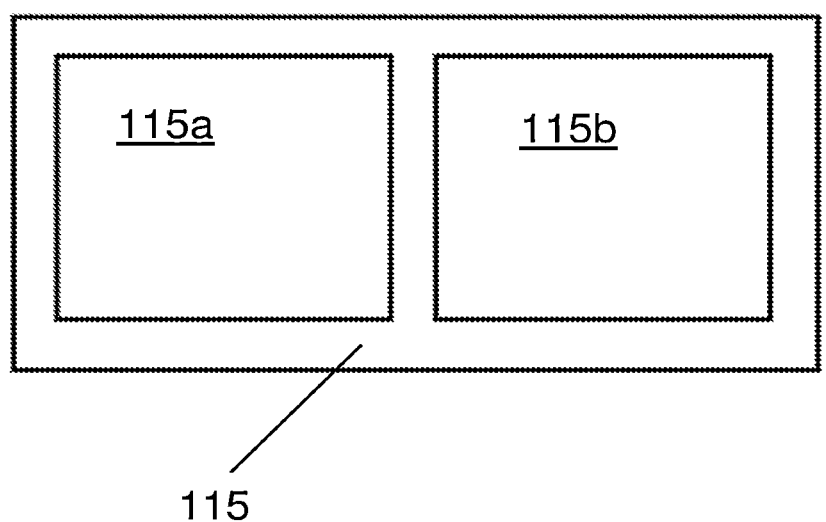
FIG. 20 shows a schematic view of an output unit according to some embodiments.

The monitoring system 1 may, in some embodiments, include an output unit 115 (see FIG. 20, for example). The output unit 115 is configured to provide an output indicative of an aspect of the operation of the monitoring system 1 to a user or operator. As such, the output unit 115 may be communicatively coupled to the processing unit 114 and/or the camera module 111—each of which may be configured to control the output unit 115 or a part thereof to convey information about an aspect of its operation. The output unit 115 may include a visual output element 115*a* such as a light (which may be a light emitting diode) or a display screen. The output unit 115 may include an audio output element 115*b* which may include a sounder (such as a buzzer, bell, or speaker). The output unit 115 may provide an indication of one or more of: that the monitoring system 1 has power, that the monitoring system 1 is operating, that the camera module 111 is capturing images, that there is an error in the operation of the monitoring system 1, that data is being transmitted from the communication sub-system 13 or the storage sub-system 12, or the like.

Figure 18:
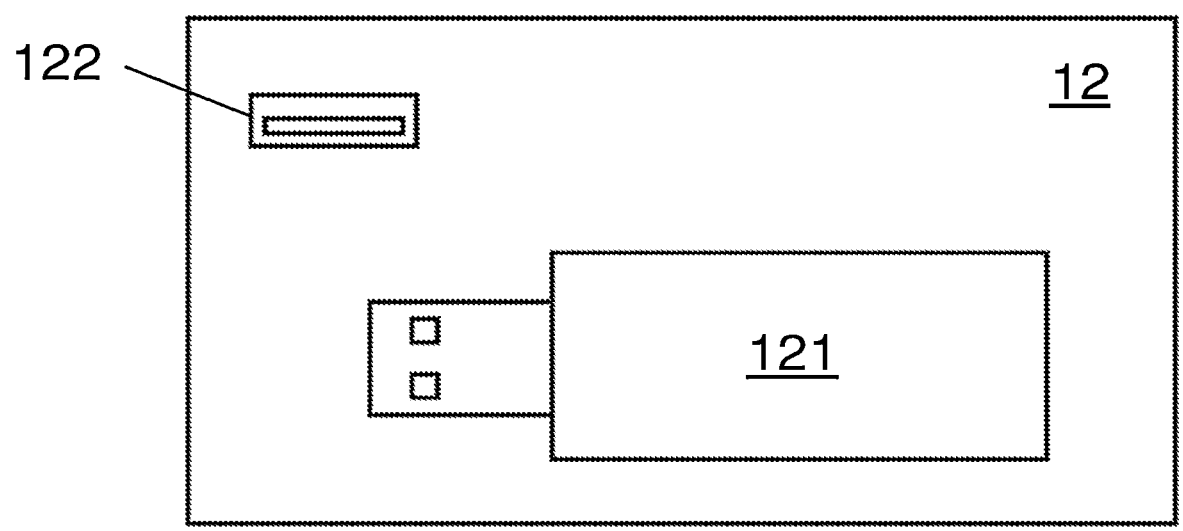
FIG. 18 shows a schematic view of a storage sub-system according to some embodiments.

As described herein, in some embodiments, the imaging sub-system 11 may be communicatively coupled to the storage sub-system 12 (see FIG. 18, for example). In particular, in some embodiments, the processing unit 114 is communicatively coupled to the storage sub-system 12 (this coupling may be via a wired data bus, for example).

The storage sub-system 12 is configured to receive data from the imagining sub-system 11 (e.g. from the processing unit 114) and to store that data on a storage device 121 of the storage sub-system 12. The storage device 121 may be a computer readable medium. In some embodiments, the storage device 121 is removable from one or more other parts of the monitoring system 1. So, for example, the storage device 121 may comprise a flash drive (otherwise known as a pen drive or memory stick). The flash drive may include non-volatile memory for the storage of data and communication elements to enable the flash drive to communicate with a computing device (such as the processing unit 114). The storage sub-system 12 may include a communication port 122 (such as a universal serial port socket/plug) which is configured to mate selectively with a corresponding communication power (e.g. a plug/socket) for the storage device 121 to enable the transfer of data from the processing unit 114 (or other part of the imaging sub-system 11) to the storage device 121.

The storage sub-system 12 may be configured to receive data from the storage device 121 and to communicate that data to the imaging sub-system 11 (e.g. to the processing unit 114 and/or the camera module 111). This data may include, for example, software or firmware updates, licence keys, and the like.

Figure 17:
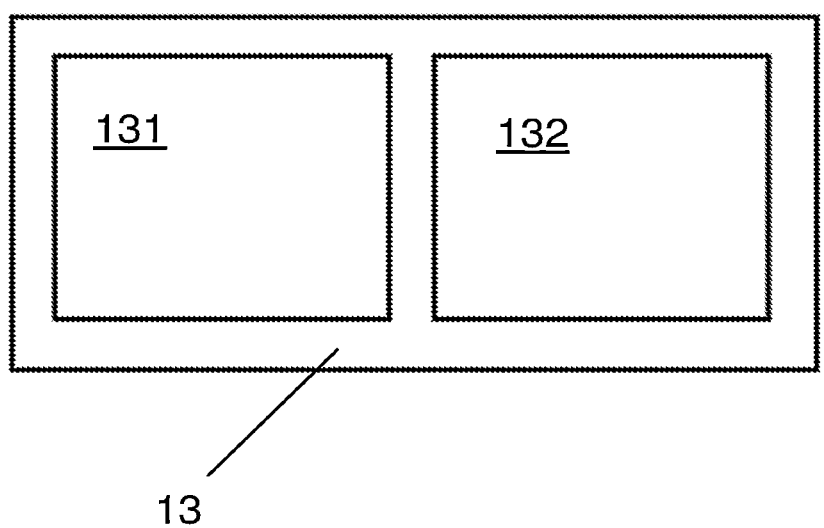
FIG. 17 shows a schematic view of a communication sub-system according to some embodiments.

The communication sub-system 13 (see FIG. 17, for example) may be communicatively coupled to the imaging sub-system 11. In particular, in some embodiments, the processing unit 114 is communicatively coupled to the communication sub-system 13 (e.g. via a wired data bus).

Accordingly, the communication sub-system 13 may be configured to receive data from the imaging sub-system 11 (e.g. from the processing unit 114) and to communicate (i.e. transmit) that data (or a part thereof) to the remote management system 3. The communicative coupling between the communication sub-system 13 and the remote management system 3 may be over a wired and/or wireless communication network. This network may include parts which use multiple different protocol and communication mechanisms. For example, the communication sub-system 13 may be configured to communicate with the remote management system 3 using one or more of: a cellular network, a wide-area network (such as the internet), and a local area network (e.g. using Ethernet® or WiFi®).

In some embodiments, the communication sub-system 13 includes, therefore, a network I/O module 131 which may be in the form of a circuit which is configured to manage and enable the communicative coupling with the remote management system 3.

The communication sub-system 13 may include a cache memory 132 which is configured to provide temporary local storage for data before it is transmitted to the remote management system 3.

Accordingly, the communication sub-system 13 may be configured to store data in the cache memory 132 when the communicative coupling to the remote management system 3 is not available. For example, if there is a wireless link in the communication network between the communication sub-system 13 and the remote management system 3 then this wireless link may not always be available—the harvester 100 may move into and out of range of the wireless link as it performs the harvesting for example. Therefore, the cache memory 132 may provide temporary storage for data which is then transmitted to the remote management system 3 when the link is available.

The communication sub-system 13 may be configured to receive data from the remote management system 3 and to communicate that data to the imaging sub-system 11 (e.g. to the processing unit 114 and/or the camera module 111). This data may include, for example, software or firmware updates, licence keys, and the like.

Figure 22:
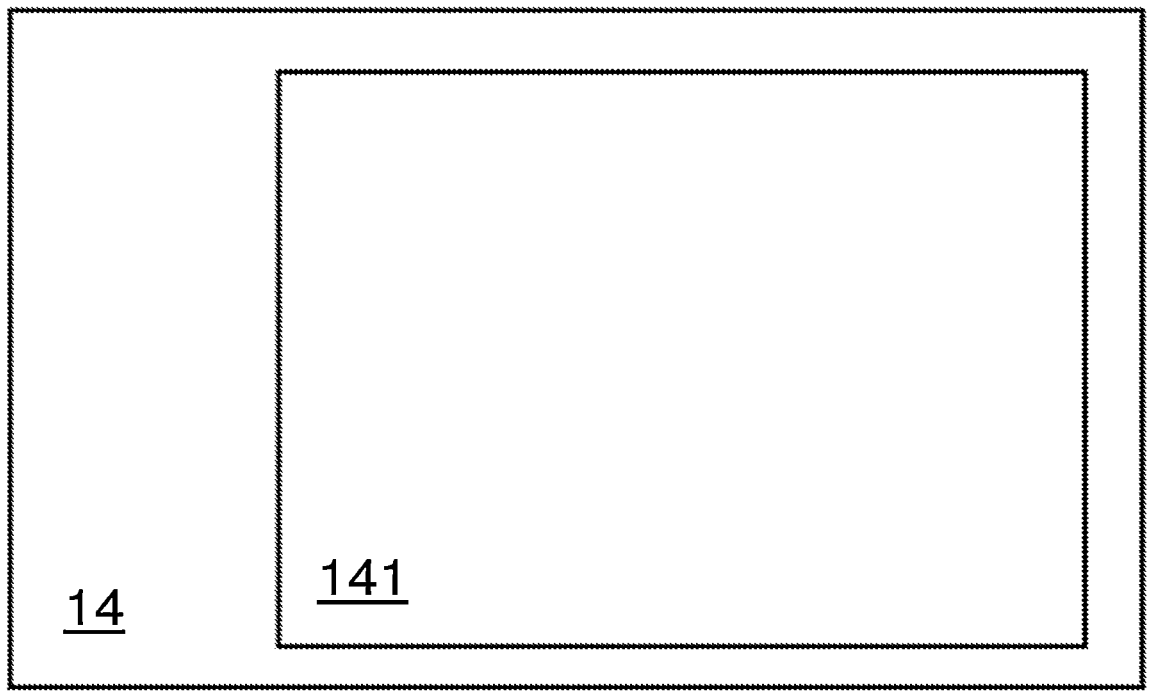
FIG. 22 shows a schematic view of a location sub-system according to some embodiments.

The location sub-system 14 (See FIG. 22, for example) is configured to determine its geographical location and, therefore, a geographical location of the monitoring system 1 (and, by extension, the harvester 100 in some embodiments). The location sub-system 14 may include, for example, a satellite-based location system module 141 such as a Global Positioning System receiver, or a receiver for one or more of GLONASS, Galileo, Beidou, IRNSS (NAVIC), or QZSS. The location sub-system 14 may, in some embodiments, be configured to receive signals transmitted from one or more beacons and may use the received signals (e.g. through triangulation) to determine its location relative to the beacons. Accordingly the location sub-system 14 may be configured to determine and output location data representative of the geographical location of the location sub-system 14 (and, hence, the monitoring system 1).

The location sub-system 14 is communicatively coupled to the imaging sub-system 11 (e.g. to the processing unit 114) and is configured to send to the imaging sub-system 11 (e.g. to the processing unit 114) data including the geographical location as determined by the location sub-system 14. In some embodiments, the location sub-system 14 is also configured to communicate current time information to the imaging sub-system 11 (e.g. to the processing unit 114).

Figure 21:
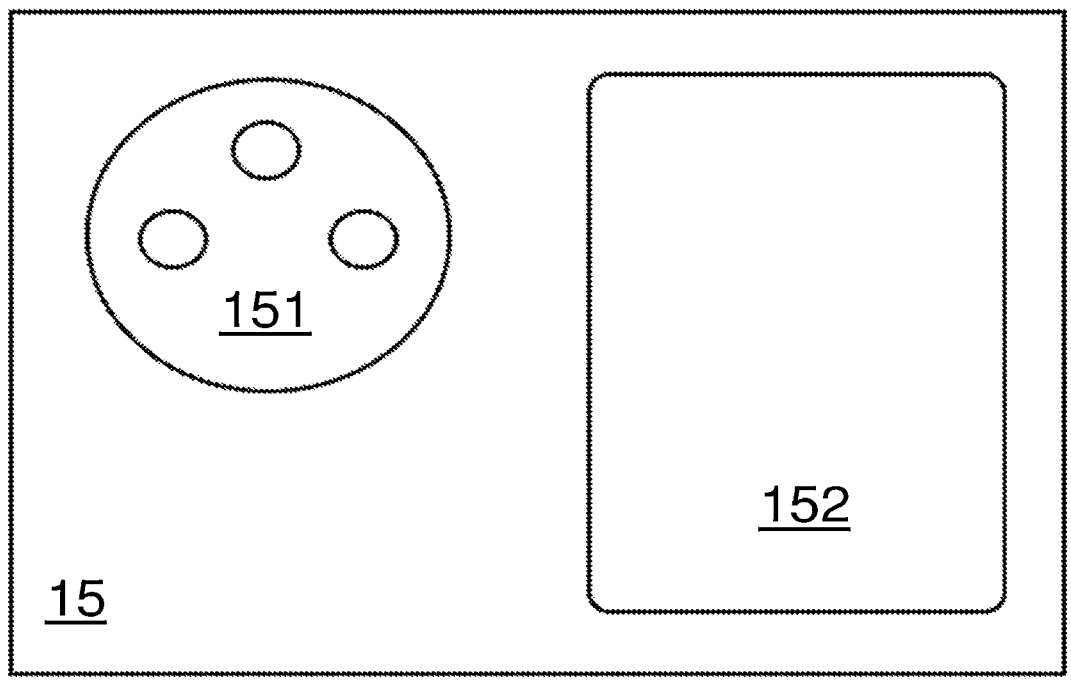
FIG. 21 shows a schematic view of a power sub-system according to some embodiments.

The power sub-system 15 (see FIG. 21, for example) may be configured to provide electrical power to one or more other components of the monitoring system 1. For example, the power sub-system 15 may be configured to provide electrical power to the imaging sub-system 11 (e.g. to one or both of the camera module 111 and the processing unit 114), and/or the storage sub-system 12, and/or the communication sub-system 13, and/or the location sub-system 14.

The power sub-system 15 may include a connector 151 which is configured to be coupled to the electrical system 105 of the harvester 100. As such, the power sub-system 15 may provide electrical power from the harvester 1 to the monitoring system 1.

The power sub-system 15 may include one or more batteries 152 which are configured to provide electrical power to the monitoring system 1.

In some embodiments, the one or more batteries 152 are used to provide an uninterruptable power supply such that variations in the electrical power from the electrical system 105 of the harvester 100 can be compensated for using electrical power from the one or more batteries 152. In some embodiments, the one or more batteries 152 are used in combination with the electrical system 105 of the harvester 152 to provide electrical power to the monitoring system 1 which has a higher voltage than the voltage provided by the electrical system 105.

In some embodiments, the monitoring system 1 is electrically isolated from the electrical system 105 of the harvester 100 and so the power sub-system 15 provides all of the electrical power required to operate the monitoring system 1 without using electrical power from the electrical system 105 of the harvester 100 (this may be achieved using the one or more batteries 152, for example).

In some embodiments, the power sub-system 15 is configured to determine when the harvester 100 is operating—e.g. when the engine 103 is running—and may start the monitoring system 1 based on the determined operation of the harvester 100. When the harvester 100 ceases to operate, then the power sub-system 15 may be further configured to detect this change and to trigger the turning off (i.e. the shutting down) of the monitoring system 1. This determining may be based on the connection of the power sub-system 15 to the electrical system 105 and/or may be based on a connection of the power sub-system 15 to a control bus of the harvester 100.

Figure 11:
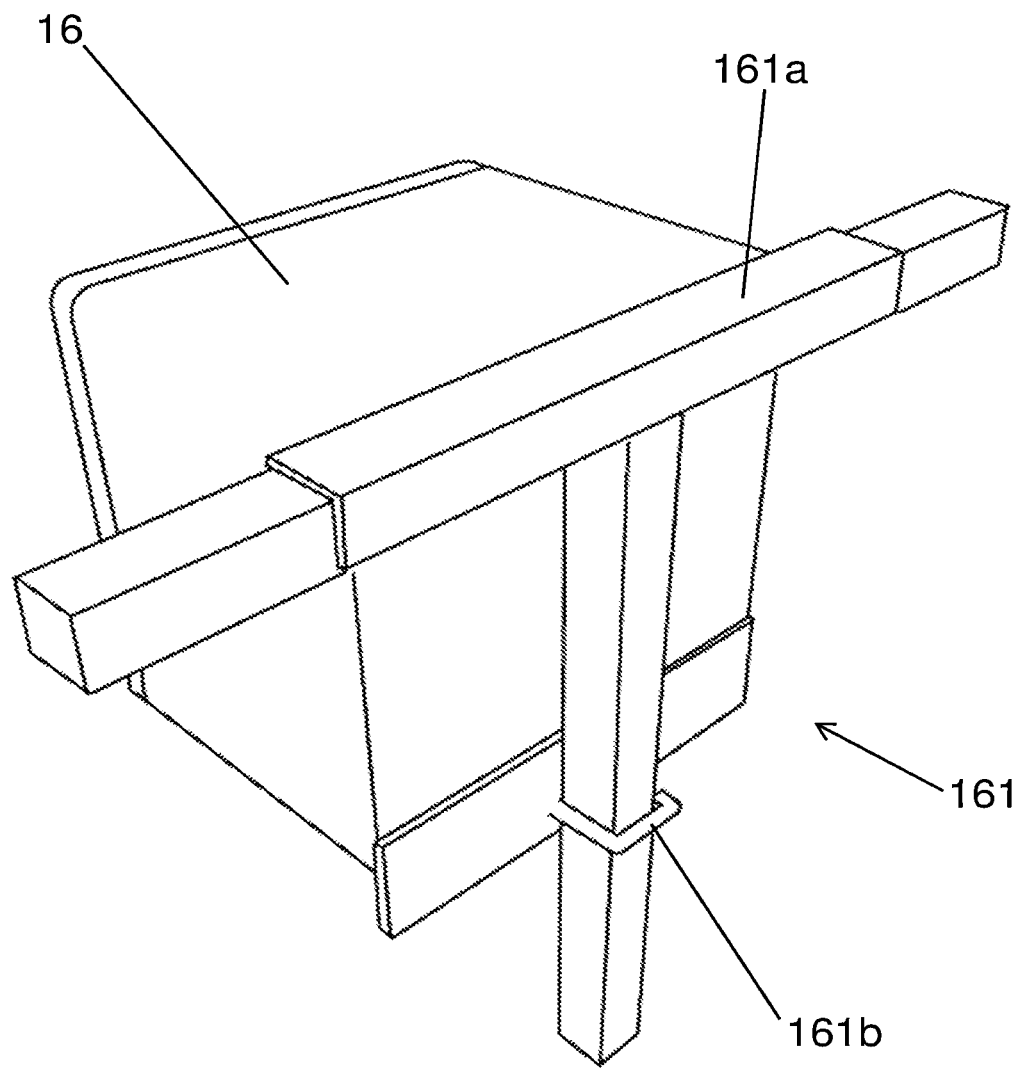
FIGS. 11 and 12 show a case and case mounting bracket according to some embodiments.
Figure 12:
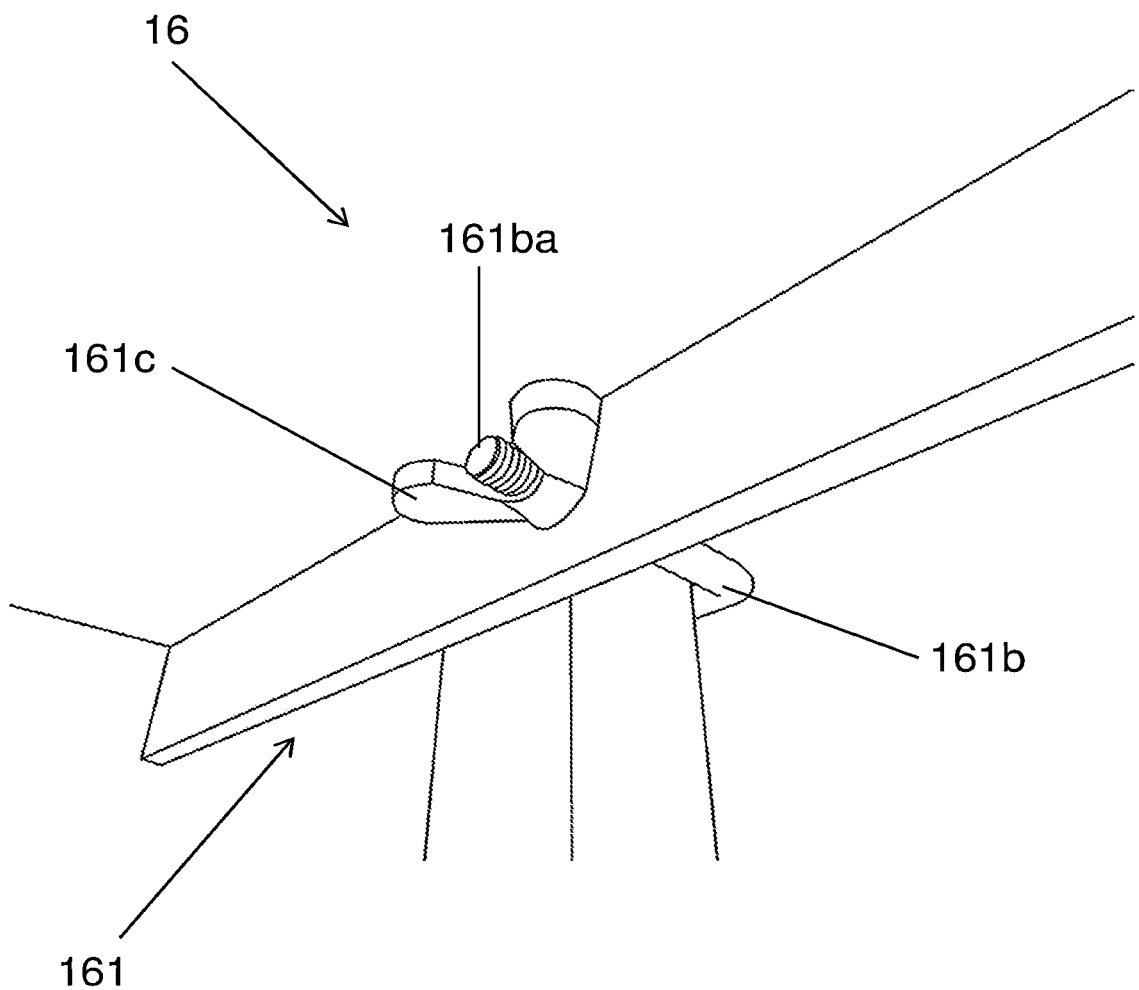

In some embodiments, the monitoring system 1 or parts thereof are provided within a case 16 (See FIGS. 11 and 12, for example). The case 16 may be configured to inhibit or substantially prevent the ingress of fluids (such as water) and/or dirt and/or may protect against vibration. The case 16 may, in some embodiments, house the processing unit 114. The case 16 may, in some embodiments, house one or more of at least part of the storage sub-system 12, at least part of the communication sub-system 13, at least part of the location sub-system 14, and at least part of the power sub-system 15.

The case 16 may carry, in an outer wall thereof, one or both of the communication port 12 and the connector 151. In some embodiments, the case 16 defines at least one port through which cables for the camera module 111 and/or location sub-system 14 may pass—these parts of the monitoring system 1, or portions thereof, being located outside of the case 16 in such embodiments. As will be appreciated, satellite-based location system module 141 may need to be located outside of the case 16 in order to be able to receive signals for its operation. In some embodiments, the satellite-based location system module 141 or an antenna thereof may be located, for example, in or adjacent the camera module 111. In other embodiments, the satellite-based location system module 141 may be locatable elsewhere on the harvester 100.

In some embodiments, the case 16 may carry, in an outer wall thereof, one or more elements of the output unit 115—e.g. the visual output element 115a and/or the audio output element 115b.

The case 16 may include a case mounting bracket 161 for securing the case 16 to a part of the harvester 100. Accordingly, in some embodiments, the case mounting bracket 161 may include a lip 161a (e.g. in the form of a right-angle section beam) which is configured to engage a generally horizontal beam or other member of the harvester 100. The lip 161a may be located towards an upper part of the case 16. The case mounting bracket 161 may include a hook member 161b which is configured to engage a generally vertical beam or other member of the harvester 100. The hook member 161b may be moveable between an extended position—in which the generally vertical beam can be moved into a channel defined by the hook member 161b and a retracted position in which the generally vertical beam is trapped within said channel. The movement of the hook member 161b may be achieved by the use of a threaded member 161c which engages a threaded part of the hook member 161ba (see FIG. 12, for example).

Figure 23:
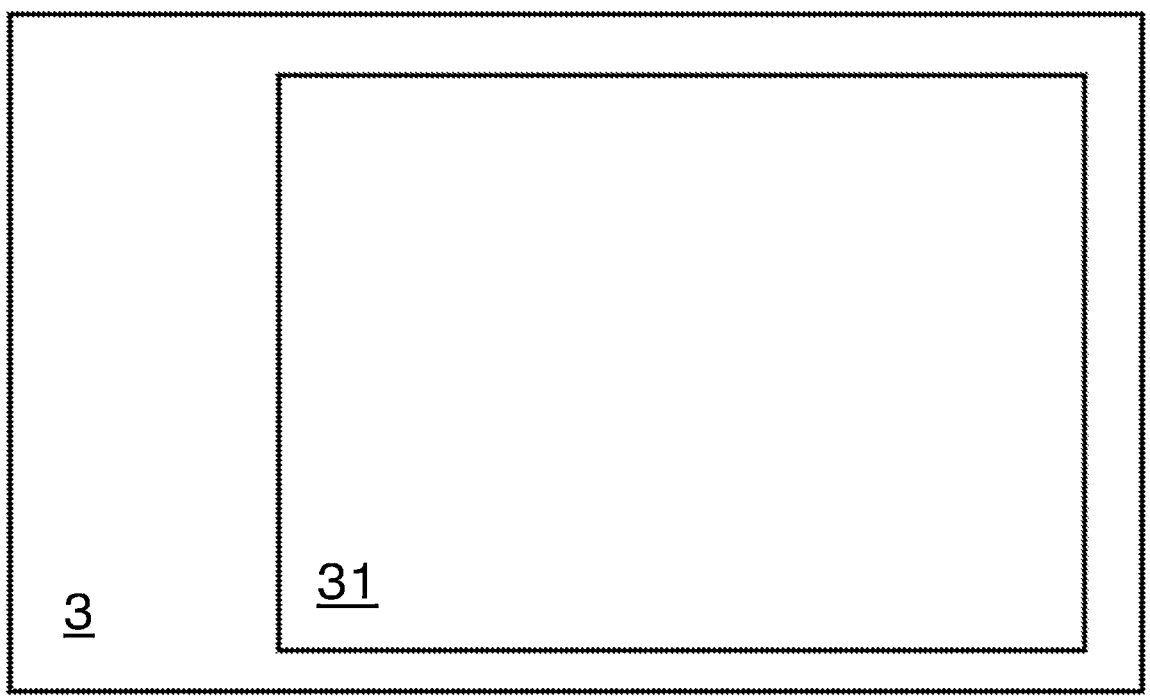
FIG. 23 shows a schematic view of a remote management system according to some embodiments.

The remote management system 3 (see FIG. 23, for example) may include a computing device 31 which is communicatively coupled to the monitoring system 1 as described herein. The monitoring system 1 (e.g. the processing unit 114) may be configured to communicate data to the remote management system 3 and may be configured to receive data from the remote management system 3. Likewise, the remote management system 3 may be configured to transmit data to the monitoring system 1 and to receive data from the monitoring system 1.

The remote management system 3 may be communicatively coupled to the monitoring system 1 via the communication sub-system 13 and this coupling may be wired or wireless. In some embodiments, the remote management system 3 is located remotely from the monitoring system 1 and the harvester 100. In some embodiments, the remote monitoring system 3 is located remotely from the monitoring system 1 but is located on or within the harvester 100 (or tractor 300).

The remote management system 3 may be configured to send software, software updates, firmware, firmware updates, licence keys, licence information, and the like to the monitoring system 1. The monitoring system 1 may be configured to install or update software or firmware based on this received data, for example.

The remote management system 3 may be a laptop, a desktop computer, a tablet, a mobile (cellular) telephone, or the like. In some embodiment, the remote management system 3 includes a server and may include multiple servers and other computing devices.

As discussed above, the monitoring system 1 may be secured to the harvester 100 in a location such that the one or more harvested items 21 pass through the field of view of the imaging sub-system 11 (e.g. of the camera module 111). This securing may be achieved by use of the mounting bracket 113 in some embodiment.

In some embodiments, the positioning of the monitoring system 1 is such that the lowermost part of the shroud 112 is between 10 cm and 30 cm from the surface over which the one or more harvested items 21 are or will pass. To achieve the desired height, the mounting bracket 113 (if used) may be adjusted using the or each adjustment arm 113e.

During operation of the harvester 100, the harvester 100 will typically move within a field 200 along rows of harvestable items 22. In the case of the harvestable items 22 being a root vegetable, then the harvestable items 22 are generally buried. The share 106 of the harvester 100 lifts the harvestable items 22—which become harvested items 21 as a result—from the ground and into the harvester 100.

Therefore, one or more harvested item 22 pass through the harvester 100 and past the field of view of the imaging sub-system 11—typically on a conveyor (as described herein).

The method of operation of the monitoring system 1 is controlled by instructions which are executed by the processing unit 114—also as described herein—and any reference to method steps in this regard should be construed as encompassing instructions which, when executed, cause those method steps to occur.

As the one or more harvested items 21 pass through the field of view of the imaging sub-system 11, the camera module 11 is instructed to capture one or more images of the one or more harvested items 21. In some embodiments, the camera module 11 is instructed by the processing unit 114 in this regard.

As described herein, the camera module 11 may include a stereoscopic camera 111a which, therefore, captures a pair of images of the one or more harvested items 21 in the field of view of the stereoscopic camera 111a.

The one or more images captured by the camera module 11 are communicated (i.e. transmitted) to the processing unit 114 which is configured, through the execution of corresponding instructions, to process the one or more images—which are represented by image data. This processing may include the identification of corresponding features in each of the pair of images and then calculating depth information. In some embodiments, this step is performed by the stereoscopic camera 111a and the stereoscopic camera 111a is configured to output to the processing unit 114 a visible light image and a depth map for that image.

In some embodiments, the camera module 11 includes a camera 111c, an infra-red transmitter 111d, and an infra-red receiver 111e. As discussed above, an image captured by the infra-red receiver 111e including infra-red light emitted by the infra-red transmitter 111d into the field of view of the camera module 111 may allow depth information to be determined by analysis of the distortion of the infra-red light. In such embodiments, a visible light image along with an infra-red light image and information about the speckle pattern of infra-red light emitted by the infra-red transmitter 111d may be sent to the processing unit 114 which may be configured to generate a depth map for the image using this information. In some embodiments, the camera module 111 is configured to perform this analysis and output, to the processing unit 114 a visible light image and a depth map for that image.

A depth map is, in general, a map containing information regarding the distance (i.e. depth) of one or more objects within the field of view of the imaging sub-system 11 (e.g. the camera module 111) from the imaging sub-system 11 (e.g. the camera module 111). In some embodiments, the depth map provides such distance/depth information on a pixel-by-pixel based on the pixels forming the visible light image—as will be appreciated, a digital image is typically formed of a plurality of pixels arranged in an array and conveying information about that part of the image.

Figure 24:
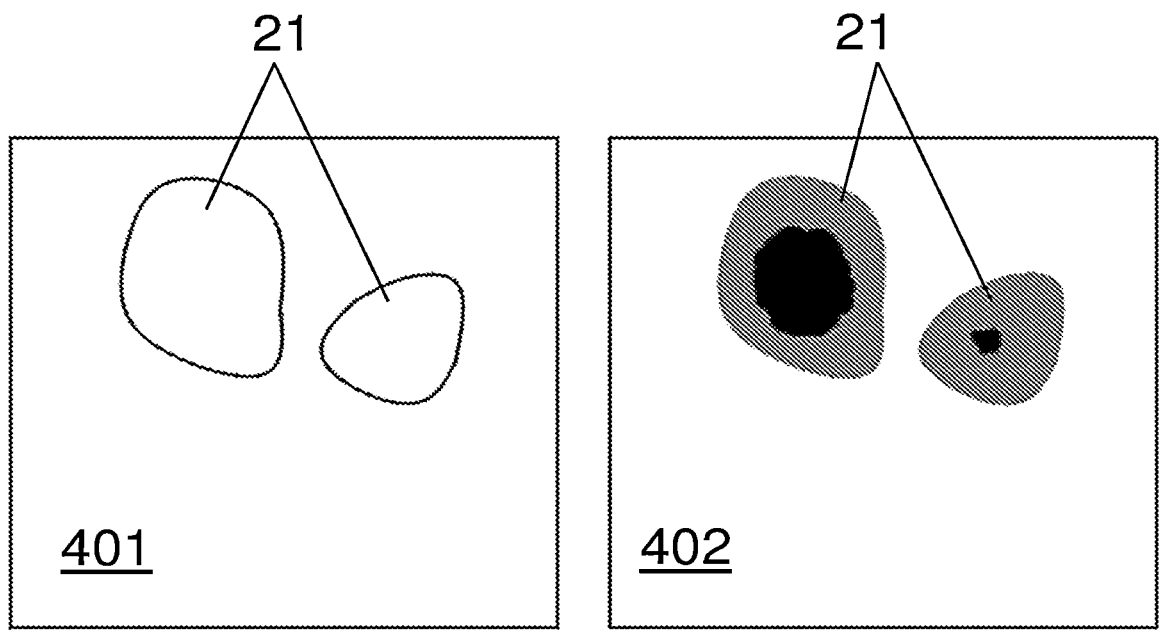
FIG. 24 shows a graphical representation of an image and depth map according to some embodiments.

For illustrative purposes, FIG. 24 depicts an example visible light image (replicated as a line drawing) 401 of two harvested items 21. FIG. 24 also depicts a simplified graphical representation of the depth map 402 for the same two harvested items 21. As can be seen, the darker shading in the depth map 40 shows parts of the image which are closer to the camera module 111 relative to the more lightly shaded parts. This representation is simplified as it only shows two different depths through shading (three including the surface on which the items 21 are located which is white). In some embodiments, there may be many different depths represented in a given depth map (i.e. more than two or three).

Therefore, the analysis of the image data received from the camera module 111 may include an initial step of determining a depth map (or the depth map may be provided by the camera module 111).

As will be appreciated, therefore, the camera module 111 may be configured to acquire three dimensional image data. In other words, the canner module 11 may be configured to determine two dimensional image data as well as depth data. This depth data may be a distance from the camera module 111 and the terms will be used interchangeably herein.

The visible light image and depth map then undergo one or more further processing steps under the control of the processing unit 114.

The image data (i.e. the visible light image and depth map collectively) includes or is likely to include information relating to one or more objects which are not of interest because they are either too far away or too close to the camera module 111.

Accordingly, the processing unit 114 may perform a depth filtering process on the image data. In accordance with the depth filtering process, image data for which the depth map indicates the data concerns objects further away from the camera module 111 than a predetermined maximum distance may be deleted from the image data. In accordance with the depth filter process, image data for which the depth map indicates the data concerns objects closer to the camera module 111 than a predetermined minimum distance may be deleted from the image data. Either or both of these depth filtering processes may be applied. The reference to the deletion of image data may include the erasing of the image data from memory or the exclusion of that image data from subsequent processing steps (without necessarily erasing the data). Depth filtering may be applied in relation to all pixels in an image such that the depth associated with each pixel is considered in turn.

The maximum distance may be a predetermined distance which is predefined by a user or operator. The maximum distance may be a distance which the monitoring system 1 determines during a calibration stage of operation.

The maximum distance may be, for example, the distance from the camera module 111 to the surface on which the one or more harvested items 21 are supported when they pass through the field of view of the camera module 111 (i.e. of the imaging sub-system 11). This may be, for example, the surface of the conveyor 108, the picking table 109, or the one or more further conveyors 110.

In some embodiments, the maximum distance may vary across the field of view of the camera module 111 (i.e. of the imaging sub-system 11). This may, therefore, allow the monitoring system 1 to take into account an incline of the surface on which the one or more harvested items 21 are supported with respect to the camera module 111. Thus, for example, the maximum distance may be defined by plane which is inclined with respect to a normal plane through the field of view of the camera module 111 (i.e. of the imaging sub-system 11).

In some embodiments, the camera module 111 is oriented such that the normal plane through the field of view of the camera module 111 is parallel to the surface—negating the need for the maximum distance to vary as described above.

Thus, objects in the image data which are closer to the camera module 111 than the maximum distance are objects which may be supported by the surface and so may be harvested items 21.

The minimum distance may be a predetermined distance which is predefined by a user or operator. The minimum distance may be a distance which the monitoring system 1 determines during a calibration stage of operation.

The minimum distance may be, for example, the distance from the cameral module 111 to a height above the surface on which the one or more harvested items 21 are supported when they pass through the field of view of the camera module 111 (i.e. of the imaging sub-system 11) which none of the one or more harvested items 21 would be likely to reach.

In some embodiments, the minimum distance may vary across the field of view of the camera module 111 (i.e. of the imaging sub-system 11) in the same manner in which the maximum distance may vary. Indeed, the minimum distance may defined by a plane which is generally parallel to a plane which defines the maximum distance.

In some embodiments, the camera module 111 is orientated such that the normal plane through the field of view of the camera module 111 is parallel to the surface—negating the need for the minimum distance to vary as described above.

Accordingly, use of the minimum and maximum distances in the depth filtering process may exclude objects which are unlikely to be harvested items 21—either because they are too large or are below the surface on which the one or more harvested items 21 pass. The use of depth filtering may exclude noise as well as features which may be visible through the slats of the conveyor and structural parts of the harvester 100 (along with other parts of the monitoring system 1 such as parts of the shroud 112).

The maximum distance may be set during a calibration stage in which the imaging sub-system 11 is controlled (e.g. by the processing unit 114) to determine the distance to the surface on which the one or more harvested items 21 will be supported. This may be performed, for example, when there are no harvested items 21 in the field of view of the camera module 111 (i.e. of the imaging sub-system 11). To achieve this some embodiments may include the step of a user or operator placing a sheet of material on that surface which can be identified by the camera module 111.

In some embodiments, the calibration stage may be completed with the harvester 100 operating and/or with one or more harvested items 21 in the field of view of the camera module 111 (i.e. of the imaging sub-system 11). This may be achieved by using the camera module 111 to identify portions of the image data which are at a generally constant distance from the camera module 11, colour analysis of the image data to determine parts of the image data relating to the surface rather than a harvested item 21, or by assessing the likely size of one or more harvested items 21 and then estimating the likely distance to the surface which supports the one or more harvested items 21. In some embodiments, the distance from the camera module 111 to an outer part of a one of the one or more harvested items 21 is determined around at least part of a perimeter of the item 21. Then the distance from the camera module 111 to a central part of the item 21 is determined (a central part need not be a geometric centre (although could be) but could be the closest art of the item 21 to the camera module 111, for example. The height difference between the outer part and the central part may be approximated to half the height of the item 21. This allows an approximation of the distance to the conveyor (by estimating the distance to the conveyor as being, generally, the distance to the outer part plus the difference in distance between the outer part and the central part).

The minimum distance may be set depending on the nature of the harvested items 21—for example, it may be expected than no one item 21 will be larger than 15 cm in width/length. In some embodiments, the minimum distance may be calculated by the processing unit 114 based on the maximum distance and a predetermined distance (which may be set by an operator or user). In some embodiments, the minimum distance is calculated by the processing unit 114 based a known or measured dimension of the shroud 112. For example, if the shroud 112 is known to extend for 1 m below the camera module 111 and the maximum distance is 1.20 cm, then no object greater than 20 cm can pass under the shroud 112 (in some embodiments) and any object closer to the camera module 111 than 1 m cannot relate to one or more harvested items 21.

The image data which has been depth filtered is, therefore, depth filtered image data.

The depth filtered image data (or the image data if no depth filtering takes place) is then analysed in order to detect one or more harvested items 21 within the field of view of the camera module 111 (i.e. of the imaging sub-system 11). This may include the performance of various techniques which may depend on the nature (e.g. typical shape, colour, and/or size) of the one or more items 21.

For example, the processing unit 114 may analyse the image data and/or depth filtered image data to identify one or more circular or elliptical objects. This may include segmentation of the image data or depth filtered image data. The segmentation may include, for example, thresholding, clustering, histogram-based methods, edge detection, region growing, and/or the like. The segmentation may be based on the depth map or the visible light image or both. Accordingly, segmentation may be based on two dimensional shapes or three dimensional shapes in some embodiments.

The image data or depth filtered image data has, therefore, been segmented into one or more likely harvested items 21—with some of the image data identified as not relating to one or more likely harvested items 21. This data is, therefore, segmented image data and includes at least a portion which represents at least one of the one or more harvested items 21.

The segmented image data may then be further processed in some embodiments by the processing unit 114 to exclude or delete some likely harvested items 21 which do not satisfy one or more criteria (or which, conversely, do satisfy one or more criteria). For example, if the one or more harvested items 21 are potatoes, then the potatoes may be covered at least partially in soil and other ground material (i.e. debris). A ball or clump of ground material may appear to be very much like a potato. However, it may be expected that at least part of the image data of the segment for a potato would include image data representing the likely colour of a potato—which may be substantially more yellow or lighter than the ground material (which may be dark brown). Therefore, by performing colour analysis on the segmented data, it may be possible to identify one or more likely harvested items 21 which are unlikely to be a harvested item 21.

In some embodiments, the camera module 111 may include a camera which is configured to capture images in non-visible light spectra. This additional image data may be processed with the image data as discussed above and may be used to help to exclude or delete likely harvested items 21 which are, in fact, unlikely to be harvested items 21.

In some embodiments, the segmentation process may include, for example, analysis of the distance of the outer parts of likely harvested items 21 from the camera module 111 to determine whether they follow a predetermined profile—which may be based on the approximate profile of a typical one of the harvested items 21. This may enable, for example, a group of items 21 which have been segmented as one likely harvested item 21 to be separated, for example.

The segmented image data may then be further processed by the processing unit 114 to determine one or more of a perimeter, a maximum dimension (e.g. a major and/or minor axis length), an area, a centroid, and a height of the one or more likely harvested items 21, from the segmented image data.

In some embodiments, the height of the one or more likely harvested items 21 is determined by analysing the segmented image data to determine an average height of the item 21 over at least part, or substantially all, of the segment for that likely harvested item 21.

In other words, the segmented image data is analysed to determine the dimensions of the one or more likely harvested items 21.

From the dimension information, the processing unit 114 may be configured to determine a volume of at least one of the one or more likely harvested items 21. This may be achieved using the height of the item 21 integrated over the area, or by modelling the item 21 as a geometric shape (such as an ellipsoid). In some embodiments, this process may include a step of shape matching in order to determine which one of a plurality of geometric shapes most closely matches the shape of the item 21 before that shape is then used to determine the volume.

The dimension information which is generated in these processes is associated with the segmented image data and, in particular, with the portions (i.e. segments) of the image data to which it relates. The dimension information may, therefore, be stored by the processing unit 114 (e.g. in the memory 114b).

The segmented image data and associated dimension information is herein referred to as sized image data—which may be stored by the processing unit 114 (e.g. in the memory 114b).

The sized image data may then be used to determine one or more properties of the one or more harvested items 21. For example, the size and/or weight distribution of the one or more harvested items 21 may be determined (weight being estimated based on the volume and a predetermined approximate density for the one or more items 21). In the case of a plurality of harvested items 21, therefore, the number of items 21 falling within predefined size and/or weight ranges can be determined.

In some embodiments, the sized image data may be used in the performance of a virtual sieving process by the processing unit 114.

In accordance with the virtual sieving process, the sized image data may be processed to generate information which is comparable to data which would have been conventionally gathered in manual sieving of the one or more harvested items 21.

For example, the virtual sieving process may fit the one or more harvested items 21 as represented by the sized image data to one or more virtual sizing apertures. If an item 21 would pass through the sizing aperture, then the item 21 is classified in accordance with one or more parameters associated with that sizing aperture.

In accordance with some embodiments, the virtual sieving process comprises taking the smallest two axes and determining whether they are smaller than the corresponding dimensions of the sizing aperture. This may include, in some embodiments, taking the smallest two perpendicular axes in a given plane.

Figure 14:
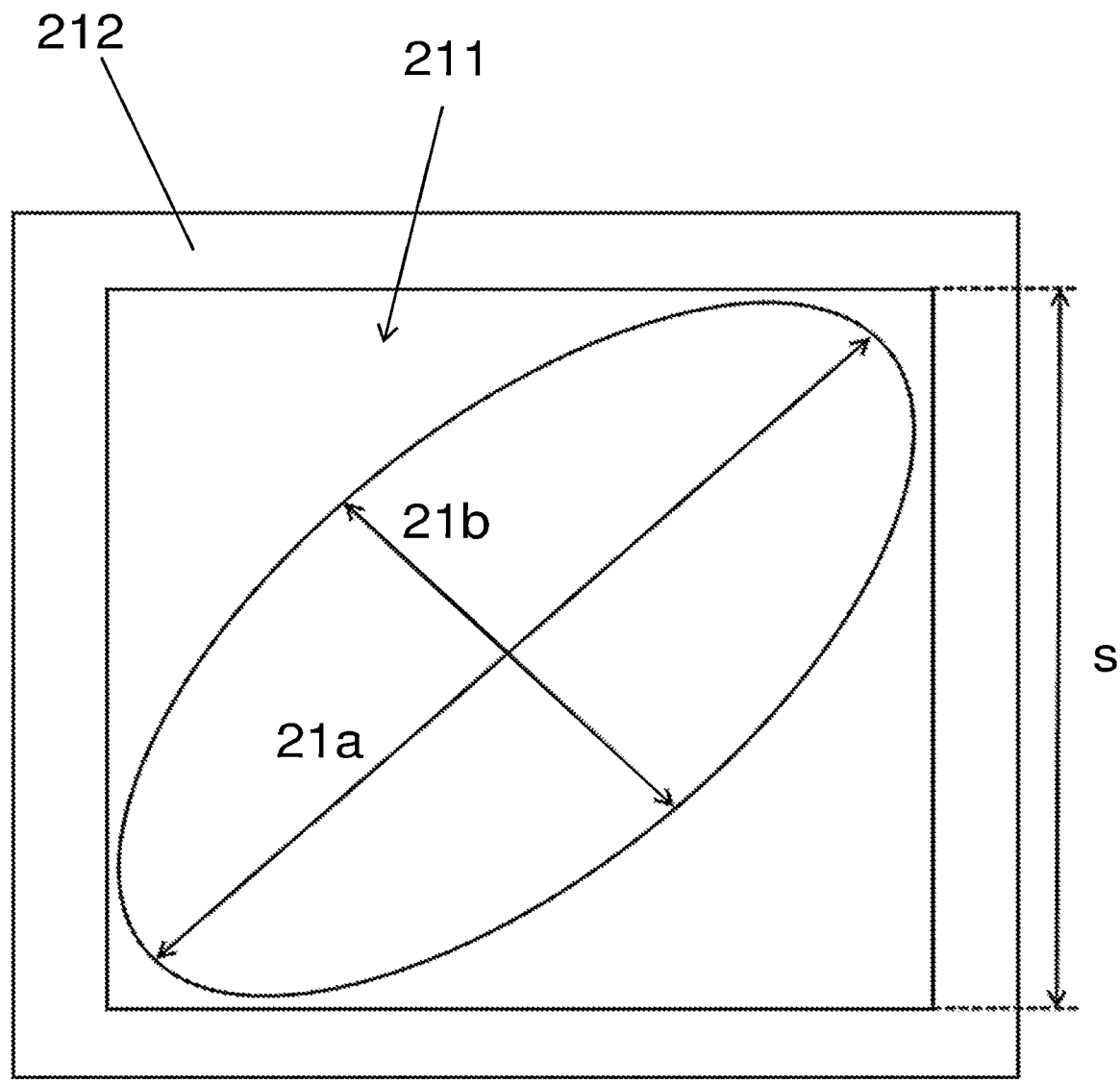
FIG. 14 shows a virtual sieve according to some embodiments.

In some embodiments, the virtual sieving process includes modelling the harvested item 21 (from the sized image data) as an ellipsoid, parameterising the ellipsoid according to the length of its axes. Determining the two shortest axes 21a, 21b and modelling the sizing aperture 211 of the virtual sieve 212 as a square of side length, s (see FIG. 14).

The item 21 will pass through the sizing aperture 211 if the following is satisfied:

$$s < \sqrt{((2a^2b^2(a^2+b^2))/((a^2+b^2)^2-(a^2-b^2)^2))}$$

wherein 'a' is the length along axis 21a and 'b' is the length along axis 21b.

Using this process, therefore, the minimum size of sieve through which the item 21 would pass can be determined. These sieve sizes (i.e. the sizing aperture sizes) can then be placed into desired ranges (e.g. according to convention in the relevant industry) to assess the one or more harvested items 21.

In some embodiments, for example, the desired ranged may be <45 mm, 45-65 mm, 65-80 mm, and >80 mm (these being ranges of s).

The output from the virtual sieving process may generally comprise sieving data.

The sized image data and/or the sieving data may be output may be stored in the memory 114b, and/or may be output by the processing unit 114 to the output unit 115 (for display to an operator), the storage sub-system 12 (for storage on the storage device 121), and/or the communication sub-system 13 (for transmission to the remote management system 3).

In some embodiments, the image data and/or filtered image data and/or sized image data and/or the sieving data may be associated with a geographical location as determined by the location sub-system 14. Accordingly, during harvesting, the location sub-system 14 may output location information to the processing unit 114 which then associates the location information with the image data, etc., so that the location from which the one or more harvested items 21 was harvested can be determined. The location information (or "location data") may be of a resolution such that a location from a field at which the item 21 was harvested can be determined. The resolution of the location data may, therefore, be to the nearest 5 m, or 10 m, or 20 m, 30 m, or 40 m, or 50 m, for example.

According to some embodiments, the processing of the image data may be configured to avoid duplication of analysis for the same harvested item 21. This can be achieved in a number of different ways.

For example, as a frame (i.e. image data from a single moment in time) is processed, an identifier may be associated with each harvested item 21 (i.e. with each likely harvested item 21 as determined in the segmentation process or thereafter). This identifier may be associated with one or more characteristics of that harvested item 21 which may include, for example, the position of the harvested item 21 within the field of view of the camera module 111 (i.e. of the imaging sub-system 11), the size of the harvested item 21, a colour of the harvested item 21, and/or the like. When the processing unit 114 analyses the next frame of image data, then the processing unit 114 may seek to identify each harvested item 21 within its field of view which was also present in the previous frame—e.g. using the one or more characteristics. As harvested items 21 are likely to move in a particular direction (e.g. as dictated by a conveyor which is conveying them) a particular harvested item 21 may move generally in this direction but may not move (or may not move substantially) in a different direction. In each frame the one or more characteristics for a particular item 21 may be updated. Therefore, by using the one or more of the characteristics it may be possible for the processing unit 114 to track the one or more harvested items 21 as they travel across the field of view in a sequence of consecutive frames.

In some embodiments, therefore, only new harvested items 21 entering the field of view in a particular frame are processed.

In some embodiments, the processing unit 14 may be configured to identify and track a sub-set (e.g. one or more) of the harvested items 21 across the field of view. The processing unit 14 may be configured to process the image data for the first frame in which that harvested item 21 is identified (to determine sized image data and/or sieving data) and the next frame which is so analysed is, for example, the last frame in which that harvested item 21 is identified or the first subsequent frame in which that harvested item 21 is not identified.

In some embodiments, there may be one or more detectable markers on a conveyor on which the one or more harvested items 21 are carried which can be detected by the monitoring system 1. The one or more detectable markers may be used to determine when the next frame should be analysed. As will be appreciated, the one or more detectable markers may be generally arrayed along a length of the conveyor on which the one or more harvested items 21 may be carried through the field of view.

In some embodiments, the speed at which the conveyor which carries the one or more harvested items 21 is travelling is known by the processing unit 114—e.g. by user or operator input. This speed of travel may be used, therefore, to time the capturing of frames for analysis so that each frame is substantially unique and consecutive with respect to the last frame.

In some embodiments, the processing unit 114 is further configured to perform a conveyor movement detection process.

According to the conveyor movement detection process, the processing unit 114 may analyse the image data from a plurality of frames to determine if the conveyor which carries the one or more harvested items 21 is moving. The output from this process may then be used to determine, for example, if a frame should be analysed to determine sized image data and/or sieving data, for example.

The conveyor movement detection process may include a comparison between two frames which may be consecutive frames, for example. In accordance with this process, the number of pixels of the image data (which may be pixels of the visible light image or data from the depth map) which differs more than a threshold level between frames is determined. If this number exceeds a minimum, then this is interpreted as movement of the conveyor; if the number of these pixels is less than the minimum, then this is interpreted as a stationary conveyor.

In some embodiments, the depth map data is used in this process and the threshold level is approximately 2 mm, or 3 mm, or 4 mm, or 5 mm. The threshold level may be required due to noise and flicker in the depth map data.

In some embodiments a plurality of frames is averaged to arrive at an average frame of image data (visible light or depth map data) and this is compared to the image data for either a single frame or for a plurality of frames averaged together. The averages may be mean, median, or modal averages.

Accordingly, embodiments may be configured to generate and record information about the one or more harvested items 21 including the size (and/or weight) of the one or more items 21 and the number of items 21 of a particular size (and/or weight) range.

In some embodiments, the processing unit 114 and/or the remote management system 3 may be configured to generate one or more tabular or graphical or cartographic representations of the processed data.

For example, the processing unit 114 and/or the remote management system 3 may be configured to generate a table which identifies the numbers of harvested items 21 which are of a particular size or fall within particular size ranges— these may be actual sizes or size ranges or sizes and ranges as determined by the virtual sieving process.

The processing unit 114 and/or the remote management system 3 may be configured to generate a graph, such as a histogram, showing the numbers of harvested items 21 which are of a particular size or fall within particular size ranges—these may be actual sizes or size ranges or sizes and ranges as determined by the virtual sieving process.

Figure 15:
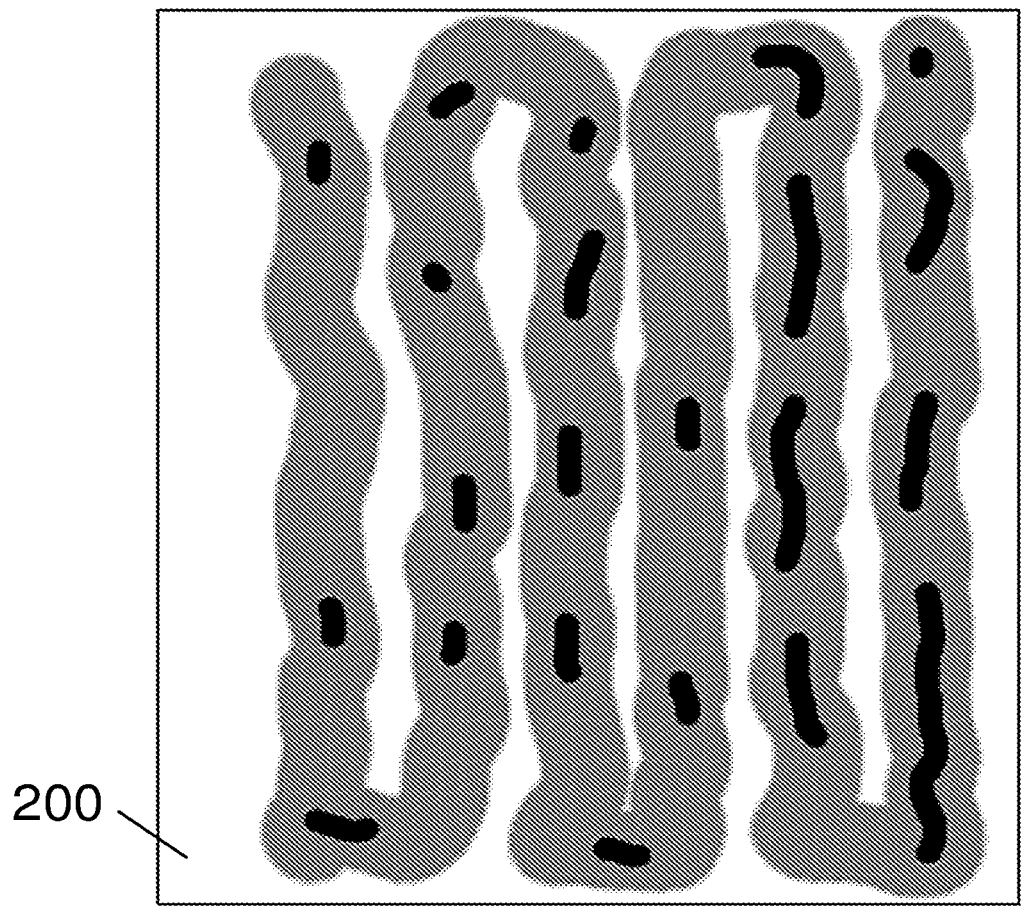
FIG. 15 shows a "heat map" representation according to some embodiments.

The processing unit 114 and/or the remote management system 3 may be configured to generate a map showing the numbers of harvested items 21 which are of a particular size or fall within particular size ranges—these may be actual sizes or size ranges or sizes and ranges as determined by the virtual sieving process—based on the location at which the items 21 were harvested. The map may be in the form of a "heat map" in which the number of items 21 and/or the number of items 21 of a particular size or size range harvested at different geographical locations is represented by different colours on a map. A simplified graphical representation of a map is shown in FIG. 15 in which the light shading shows the path of the harvester 100 through the field 200 and the dark shading shows the location at which items 21 meeting the specified criteria (e.g. size or size range) were harvested or where most of those items 21 were harvested. The figure is simplified as there may be more information shown about the number of items 21 using additional shades or colours, for example.

In some embodiments, the sized image data, the sieving data, and/or the generated representations may be associated with the container 107 or containers 107 to which the items 21 are delivered—e.g. by associating the data and/or the representation with an identifier for the container 107 or containers 107.

A date and/or time may be associated with the sized image data, the sieving data, and/or the generated representations. This date and/or time may be indicative of the date and/or time of harvesting and may be stored in association with that data or representation in generally the same location.

As will be appreciated, the information which is generated by the monitoring system 1 may be generated as the one or more harvested items 21 are harvested. This can have notable advantages in ensuring the efficient handling and processing of the one or more harvested items 21 because the information is known from a very early stage.

For example, the determined size information can be compared to one or more orders from customers such that the one or more harvested items 21 (e.g. by the container 107) may be allocated to a particular order and processed in accordance with the requirements for that order.

In some embodiments, the subsequent processing of the one or more harvested items 21 may be prioritised (e.g. automatically) in accordance with the size information determined by the monitoring system 1 or the monitoring and management system 4.

In some embodiments, the size information can be analysed to determine the locations at which particular sizes of harvested items 21 have been historically harvested. This may enable targeted harvesting of harvestable items 22 to meet a particular order or request.

In some embodiments, the conditions at one or more locations can be assessed based on the size information and one or more actions taken to alter those decisions as a result—e.g. the application of a fertiliser.

One or more of these resulting actions may be implemented in an automated manner—e.g. by the remote management system 3 instructing equipment to perform the resulting actions.

Although embodiments have been described with reference to the provision of a monitoring system 1 which is fitted to a harvester 100 (and which may be retrofitted to a harvester 100), some embodiments encompass a harvester 100 which is manufactured with the monitoring system 1. In some such embodiments, one or more of the components of the monitoring system 1 may be shared with one or more other functions and/or systems of the harvester 100. For example, the location sub-system 12 may be part of a navigation system for the harvester 100 (or the tractor 300), and the like.

As mentioned herein, information about the one or more harvested items 21 may be displayed using the remote management system 3 and the remote management system 3 may be provided within the harvester 100 in some embodiments. In some such embodiments, the remote management system 3 may be provided in the cab 104 of the harvester 100 (or in the cab 303 of the tractor 300).

Figure 13:
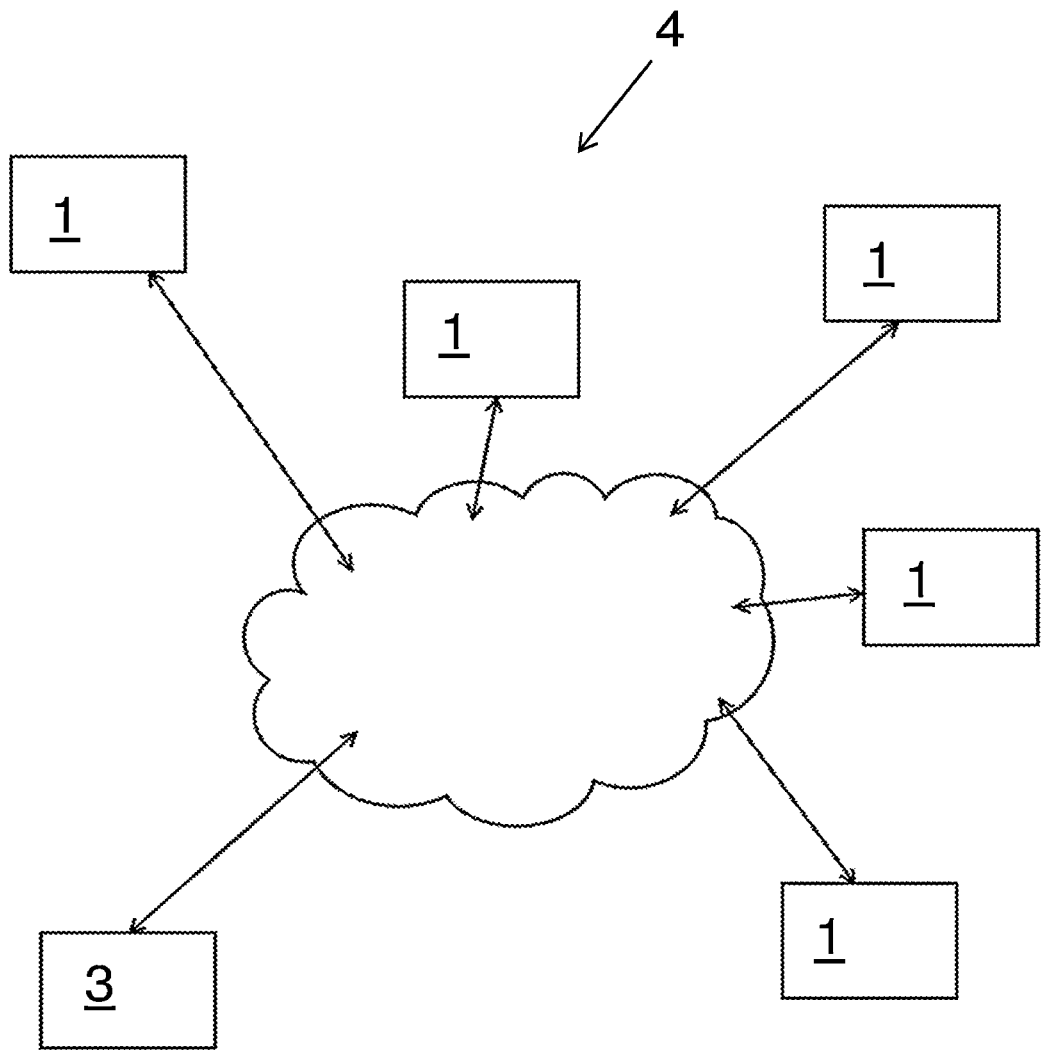
FIG. 13 shows a schematic view of a monitoring and management system according to some embodiments.

In some embodiments, the remote management system 3 is configured to communicate with a plurality of monitoring systems 1 which are each associated with a different harvester 100 (see FIG. 13, for example). The information output by the monitoring systems 1 may be collated in the remote management system 3 which may be further configured to assess trends and make predictions regarding, for example, crop yields, based on the received information.

The following methods and techniques are described in relation to potato harvesting, but it should be appreciated that references potatoes should be construed generally as referring to harvestable items 22. Harvestable items 22 may be any root vegetables which are buried underground.

Figure 28:
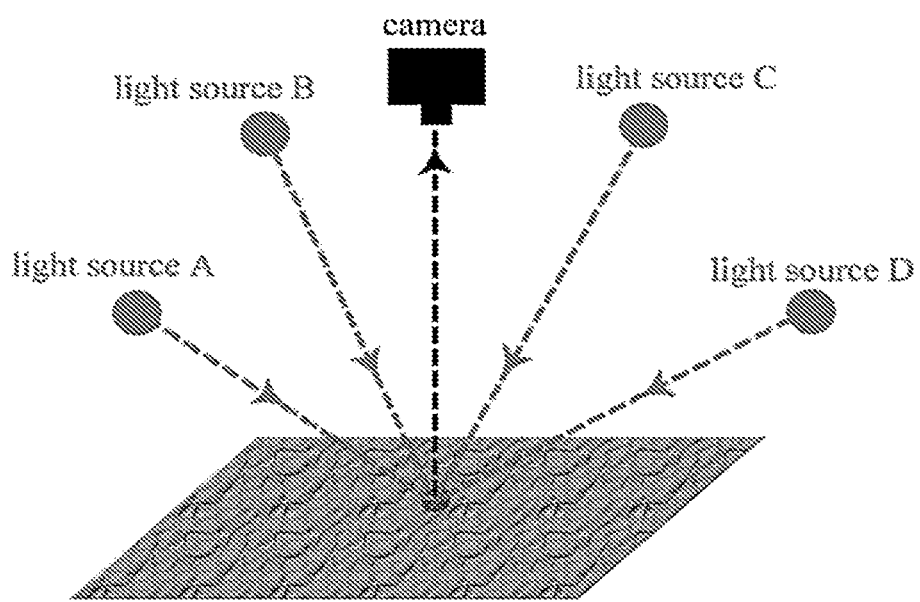
FIG. 28 shows the principle of photometric stereo according to some embodiments.

Photometric stereo is a technique which employs a single camera and a set of at least three lights in known locations. Here, rather than calculating a depth image or a point cloud, a surface normal field is recovered from an object that is illuminated from different directions while a viewing direction is held constant (see FIG. 28, for example). The fraction of the incident illumination reflected in a particular direction is dependent on the surface orientation—this can be modelled using Lambert's Law. Therefore, when the directions of incident illumination are known and the radiance values are recorded, the surface orientation can then be derived.

Three views can be sufficient to uniquely determine the surface normals as well as albedos at each image point, provided that the directions of incident illumination are not collinear in azimuth. Four illuminants/views can be employed for improved reconstruction performance.

The equations involved in determining the albedo and surface normal vectors from the three recovered images can be derived:

Let, $I_1(x, y)$, $I_2(x, y)$ and $I_3(x, y)$ be the three images captured under varied illumination directions. By varying the illumination direction, the reflectance map is changed accordingly, giving equation (1).

$$\begin{cases} I_1(x, y) = R_1(p, q) \\ I_2(x, y) = R_2(p, q) \\ I_3(x, y) = R_3(p, q) \end{cases} \quad (1)$$

where $R_1(p, q)$, $R_2(p, q)$ and $R_3(p, q)$ are the reflectance maps under different illumination directions, while p and q are gradients of the surface in the x and y directions, respectively. A general reflectance map in the gradient representation of the surface orientation and illumination direction may be expressed in equation (2).

$$R(p, q) = \frac{e(1 + pp_s + qq_s)}{\sqrt{1 + p^2 + q^2}\sqrt{1 + p_s^2 + q_s^2}} \quad (2)$$

where $\varrho$ is the albedo, $\vec{N} = [-p, -q, 1]$ defines the surface normal vector, and $\vec{L} = [-p_s, -q_s, 1]$ defines the illumination direction. Let the surface be $z=f(x,y)$, the gradients in x and y directions become:

$$\begin{cases} p = -\dfrac{\partial f(x, y)}{\partial x} \\ q = -\dfrac{\partial f(x, y)}{\partial y} \end{cases} \quad (3)$$

These equations are derived under the assumptions that 1) the object size is small relative to the viewing distance. 2) The surface is Lambertian. 3) The surface is exempt from cast-shadows or self-shadows.

The Photometric stereo method reconstructs one surface normal vector per pixel and, therefore, it is capable of recovering surface normals in high resolution. 3D reconstructions by Photometric stereo are spatially consistent with Photometric stereo images (greyscale) captured by a single camera. This eliminates the correspondence problem that perplexes binocular vision solutions, i.e., the problem of ascertaining how pixels in one image spatially correspond to those in the other image. Furthermore, the resolution of Photometric stereo reconstructions is flexible and is solely determined by the camera employed thereby allowing Photometric stereo to be configured for a specific device or application. In contrast, data obtained by RGB-D cameras are normally of low spatial and depth resolution which severely degrade as the sensor-object distance increases. In addition, Photometric stereo reconstructions provide detailed high-frequency 3D texture information. 3D depth information may also be derived from Photometric stereo surface normals when necessary (although some errors can be introduced during this step). In contrast to Photometric stereo, binocular stereo is more prone to noise and artefacts since it directly recovers depth of surface (image centred) data rather than surface orientations (object centred). Although being highly accurate and of high resolution, Photometric stereo devices can be constructed at a similar or lower cost to the RGB-D or Kinect(®) camera with the potential flexibility of being portable or long-range. It is, therefore, a powerful solution to 3D imaging.

Despite these potential advantages, utilisation of photometric stereo in machine vision applications has been rather limited in comparison to other techniques such as the RGB-D camera. This is perhaps because RGB-D cameras are available off the shelf at low cost in the form of devices such as the Kinect(®) but this is not true of photometric stereo, where instead the user is obliged to mount and configure a camera and a set of lights in known orientations. In addition, it is necessary to switch each light at high speed and in exact synchronisation with the image capture—all of which can prove to be a considerable challenge in terms of instrumentation and programming. Another reason is that the RGB-D camera, as the name suggests, concurrently produces RGB and depth images for a given scene. In contrast, implementing photometric stereo requires processing and combining image intensities and to ensure maximum resolution when doing this, grey-scale cameras are usually employed—consequently the albedos often emerge as greyscale images. It is possible to also capture RGB images by replacing the grey scale camera with a colour one. This may be used in the field for plant analysis.

In addition to recovering the texture and shape of the surface, photometric stereo provides a robust means of separating surface 3D and 2D textures—thereby providing good quality 3D surface data and accurate colour data in situations where conventional images would reflect hue effects or changes in surface pigmentation. Once the 3D surface shape data has been recovered, it must be analysed in order to identify meristems for implementing directed weeding. This may be analysed by employing two metrics: "Shape Index", as proposed by Koenderink and "HK Segmentation" (based on "principal curvatures" calculated using the Hessian matrix of the second order partial differentials of the surface). Tests have indicated that the HK-measure gives a better indication of where the meristem may fall, compared to the shape index.

A major advantage of photometric stereo is that the surface can be analysed in 3D at a generally much higher resolution than is the case for other methods—it is only limited by the imaging resolution of the camera/lens employed. Consequently, the use of photometric stereo also offers potential to employ machine vision for generating new advanced capabilities for plant analysis such as phenotyping.

A four source Photometric stereo system is incapable of capturing data from a moving platform as motion between the first and last frame would prevent successful calculation of the surface normals. Therefore, a two-source method may be used which allows calculation of the surface gradient in one direction (2.5 dimensions). This method requires lights to be in line with the x-axis of the camera (i.e. the direction of movement) in order to recover surface normals in that plane. In some embodiments, two near-infrared line lights may recover a surface normal from a tile moving along a conveyor. Although this may not allow full 3D reconstruction of the surface, the gradient along the x-direction is sufficient to obtain useful representation of surface shapes—thereby enabling segmentation of moulding defects. The situation for plant analysis is similar in that the surface normal data using only two sources is incomplete, but the component in the x plane can still be used for locating the meristem. This may be achieved by manually labelling the meristems in a series of plant gradient maps, and using this location data for training a classifier. The classifier may then be used to scan gradient maps of other plants to identify similar gradient features (with strength of match indicated by a heat—map), thereby locating a meristem. Tests have shown that although identification of the plant meristems is more challenging than in the case of four light Photometric stereo, it may still be acceptable. On-going work involves further increasing the resolution of the gradient maps, combined with more powerful neural network modelling with the aim of increasing meristem location reliability over a wide range of plant types.

Following on from weed detection methods, newly emerging low-cost vision technologies are being employed to gather 3D potato tuber data in the field, during harvesting.

Various characteristics of critical interest may be detected by recovering the texture and shape of a potato surface. These may include the presence of disease (e.g. potato blight or fungal infection), damage due to fauna (pests in the soil), damage sustained during harvesting and/or the presence of substantial soil on the potato.

The application of Photometric stereo techniques to in-depth potato analysis is a promising area and is the subject of ongoing research.

Potato metrology systems are operable with a relatively wide range of potato sizes, for example, <45 mm, 45-65 mm, 65-80 mm and 80+ mm. There is often an over-estimation of the major axis (length), due to potatoes not being true ellipsoids in shape; however, by only use the minor axis (width) and height in the sizing estimation, the quality of the resulting size gradings has not been found to be affected.

Power supplies for portable Photometric stereo have also been trialled. It would be expected that the potato metrology system could operate from a tractor power supply, with the power supply only being needed to allow a computer to shut down cleanly when it detected that the line in was disconnected, and also to "clean" a signal from the tractor to produce a reliable 19V output. However, it has shown that it would be advisable to run the system from a separate 12 lead-acid accumulator (i.e. a car battery) and to employ the tractor power only for charging the battery.

Additional aspects of the present disclosure include:

According to a first aspect of the present disclosure, a harvester monitoring system configured to determine one or more parameters associated with harvested items, the system comprising: a camera module having a field of view and configured to generate image data associated with the harvested items; a mounting bracket configured to secure the camera module to a harvester such that a conveyor of the harvester is within the field of view of the camera module; a location sub-system configured to determine and output location data representative of a geographical location of the harvester monitoring system; and a processing unit configured to receive the image data and the location data, to determine one or more parameters associated with the harvested items, and to record the one or more parameters in association with the location data on a computer readable medium, wherein the camera module is configured to determine depth data for the harvested items.

In a second aspect, the harvester monitoring system according to the first aspect, wherein the depth data is a depth map.

In a third aspect, the harvester monitoring system according to the first or second aspects, wherein the camera module includes a stereoscopic camera.

In a fourth aspect, the harvester monitoring system according to the first or second aspects, wherein the camera module includes a visible light camera, an infra-red transmitter, and an infra-red receiver, and the depth data is determined by analysis of a distortion pattern of infra-red light emitted by the infra-red transmitter and received by the infra-red receiver.

In a fifth aspect, the harvester monitoring system according to any preceding aspect, wherein the camera module includes a shroud configured to shield a camera of the camera module from ambient light.

In a sixth aspect, the harvester monitoring system according to the fifth aspect, wherein the shroud includes a downwardly and outwardly extending skirt at a part of the shroud which is remote from the camera of the camera module.

In a seventh aspect, the harvester monitoring system according to any preceding aspect, further including a protective case in which the camera module is housed, wherein the protective case is configured to shield the camera module from one or more of fluid, dirt, and vibration.

In an eighth aspect, the harvester monitoring system according to any preceding aspect, wherein the mounting bracket is an adjustable bracket which is configured to allow the height of the camera module from the conveyor to be adjusted.

In a ninth aspect, the harvester monitoring system according to any preceding aspect, wherein the mounting bracket includes at least one mounting beam member with one or more mounting hooks associated therewith, the one or more mounting hooks being configured to engage at least part of the harvester.

In a tenth aspect, the harvester monitoring system according to the ninth aspect, wherein the one or more mounting hooks include at least one mounting hook which is telescopically secured to the at least one mounting beam member.

In an eleventh aspect, the harvester monitoring system according to any preceding aspect, wherein the location sub-system includes a satellite-based location system module which is configured to receive signals from a satellite-based location system.

In a twelfth aspect, the harvester monitoring system according to any preceding aspect, wherein the processing unit is configured to depth filter the image data to exclude or delete parts of the image data which are more than a maximum distance away from the camera module.

In a thirteenth aspect, the harvester monitoring system according to any preceding aspect, wherein the processing unit is configured to depth filter the image data to exclude or delete parts of the image data which are less than a minimum distance away from the camera module.

In a fourteenth aspect, the harvester monitoring system according to any preceding aspect, wherein the processing unit is configured to segment the image data into at least one portion which represents one of the harvested items.

In a fifteenth aspect, the harvester monitoring system according to any preceding aspect, wherein the one or more parameters include size information.

In a sixteenth aspect, the harvester monitoring system according to the fifteenth aspect, wherein the size information includes one or both of a dimension of the harvested items and a weight of the harvested items.

In a seventeenth aspect, the harvester monitoring system according to the sixteenth aspect, wherein the processing unit is configured to categorise the harvested items based on the size information.

In an eighteenth aspect, the harvester monitoring system according to the seventeenth aspect, wherein the processing unit is configured to categorise the harvested items by determining whether the harvested items would pass through a sizing aperture of a virtual sieve base on the sizing information.

In a nineteenth aspect, the harvester monitoring system according to any preceding aspect, further including a storage sub-system which is configured to store the one or more parameters in association with the location data.

In a twentieth aspect, the harvester monitoring system according to any preceding aspect, further including a communication sub-system which is configured to transmit the one or more parameters in association with the location data to a remote management system.

In a twenty-first aspect, the harvester monitoring system according to any preceding aspect, further including a power sub-system which includes one or more batteries which are used to compensate for variations in electrical power delivered to the monitoring system by an electrical system of the harvester or to provide the monitoring system with electrical power which has a higher voltage than a voltage of the electrical power delivered by the electrical system of the harvester.

In a twenty-second aspect, the harvester monitoring system according to any preceding aspect, wherein the location information is indicative of the location at which the items were harvested.

In a twenty-third aspect, the harvester including a harvester monitoring system according to any preceding aspect.

In a twenty-fourth aspect, the harvester according to the twenty-third aspect, wherein the harvester monitoring system is carried by the harvester.

In a twenty-fifth aspect of the present disclosure, a monitoring method to determine one or more parameters associated with harvested items, the method comprising: generating image data associated with the harvested items using a camera module having a field of view, the camera module being secured by a mounting bracket to a harvester such that a conveyor of the harvester is within the field of view of the camera module; determining and outputting location data representative of a geographical location of the harvester monitoring system using a location sub-system; receiving the image data and the location data at a processing unit; determining one or more parameters associated with the harvested items at the processing unit based on the received image data; and recording, using the processing unit, the one or more parameters in association with the location data on a computer readable medium, wherein the camera module is configured to determine depth data for the harvested items.

In a twenty-sixth aspect, the monitoring method according to the twenty-fifth, further including: generating a graphical representation in the form of a map indicating the one or more parameters at locations based on the location data.

In a twenty-seventh aspect, a computer readable medium having instructions stored thereon which, when executed by a processing unit, cause the method of the twenty-fifth or twenty-sixth aspects to be performed.

In a twenty-eighth aspect of the present disclosure, a harvester monitoring system substantially as herein described with reference to the accompanying figures.

In twenty-ninth aspect of the present disclosure, a harvester substantially as herein described with reference to the accompanying figures.

In a thirtieth aspect of the present disclosure, a monitoring method substantially as herein described with reference to the accompanying figures.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the aspects of the present disclosure in diverse forms thereof.

What is claimed is:

1. A monitoring system configured to determine one or more parameters associated with harvested items, the system comprising:
   a camera module configured to generate image data associated with the harvested items, the image data including depth data for the harvested items and images of the harvested items; and
   a processing unit configured to receive the image data and to determine the one or more parameters associated with the harvested items,
      wherein the one or more parameters include size information including a dimension of a first harvested item of the harvested items, and
      wherein the processing unit is further configured to categorise the first harvested item by determining whether the first harvested item would pass through a sizing aperture of a virtual sieve based on the size information, wherein the processing unit is further configured to track the first harvested item across the images by:
identifying the first harvested item in a first image of the image data; and
identifying the first harvested item in a second image of the image data, so as to avoid duplication of the virtual sieving process for the first harvested item.

2. The monitoring system according to claim 1, wherein the camera module includes a stereoscopic camera.

3. The monitoring system according to claim 1, wherein the camera module includes a visible light camera, an infra-red transmitter, and an infra-red receiver, and the depth data is determined by analysis of a distortion pattern of infra-red light emitted by the infra-red transmitter and received by the infra-red receiver.

4. The monitoring system according to claim 1, wherein the processing unit is configured to depth filter the image data to exclude or delete parts of the image data which are more than a maximum distance away from the camera module.

5. The monitoring system according to claim 1, wherein the processing unit is configured to depth filter the image data to exclude or delete parts of the image data which are less than a minimum distance away from the camera module.

6. The monitoring system according to claim 1, wherein the processing unit is configured to segment the image data into at least one portion which represents one of the harvested items.

7. The monitoring system according to claim 1, wherein the size information further includes a weight of the first harvested item.

8. The monitoring system according to claim 1, further including a storage sub-system which is configured to store the one or more parameters in association with location data acquired by a location module of the monitoring system.

9. The monitoring system according to claim 1, further including a communication sub-system which is configured to transmit the one or more parameters in association with the location data to a remote management system.

10. The monitoring system according to claim 1, comprising a conveyor configured to convey the harvested items, wherein the camera module is secured by a camera module mount such that the conveyor passes through a field of view of the camera module.

11. A harvester including a monitoring system, wherein:
the monitoring system is carried by the harvester;
the monitoring system is configured to determine one or more parameters associated with harvested items; and
the monitoring system comprises:
a camera module configured to generate image data associated with the harvested items, the image data including depth data for the harvested items and images of the harvested items; and
a processing unit configured to receive the image data and to determine the one or more parameters associated with the harvested items,
wherein the one or more parameters include size information including a dimension of a first harvested item of the harvested items, and
wherein the processing unit is further configured to categorise the first harvested item by determining whether the first harvested item would pass through a sizing aperture of a virtual sieve based on the size information,
wherein the processing unit is further configured to track the first harvested item across the images by:
identifying the first harvested item in a first image of the image data; and
identifying the first harvested item in a second image of the image data, so as to avoid duplication of the virtual sieving process for the first harvested item.

12. The harvester according to claim 11, comprising a conveyor configured to convey the harvested items, wherein the camera module is secured by a camera module mount such that the conveyor passes through a field of view of the camera module.

13. A computer-implemented monitoring method to determine one or more parameters associated with harvested items, the method comprising:
receiving image data associated with the harvested items from a camera module; and
determining the one or more parameters associated with the harvested items at a processing unit based on the received image data, wherein the image data includes depth data for the harvested items and images of the harvested items, and wherein the one or more parameters include size information including a dimension of a first harvested item of the harvested items, and
categorising the first harvested item by determining whether the first harvested item would pass through a sizing aperture of a virtual sieve based on the size information,
the method further comprising the processing unit tracking the first harvested item across the images by:
identifying the first harvested item in a first image of the image data; and
identifying the first harvested item in a second image of the image data, so as to avoid duplication of the virtual sieving process for the first harvested item.

14. The computer-implemented monitoring method according to claim 13, wherein receiving image data associated with the harvested items from a camera module comprises receiving image data associated with the harvested items from a camera module secured by a camera module mount such that a conveyor conveying the harvested items passes through a field of view of the camera module.

15. A non-transitory computer readable storage medium having instructions stored thereon which, when executed by a processing unit, cause the processing unit to:
receive image data associated with the harvested items from a camera module; and
determine the one or more parameters associated with the harvested items at a processing unit based on the received image data, wherein the image data includes depth data for the harvested items and images of the harvested items, and wherein the one or more parameters include size information including a dimension of a first harvested item of the harvested items, and
categorise the first harvested item by determining whether the first harvested item would pass through a sizing aperture of a virtual sieve based on the size information,
wherein the instructions further cause the processing unit to track the first harvested item across the images by:
identifying the first harvested item in a first image of the image data; and
identifying the first harvested item in a second image of the image data, so as to avoid duplication of the virtual sieving process for the first harvested item.

16. The non-transitory computer readable storage medium of claim 15, wherein receiving image data associated with the harvested items from a camera module comprises receiving image data associated with the harvested items from a camera module secured by a camera module mount such that a conveyor conveying the harvested items passes through a field of view of the camera module.

* * * * *